(12) United States Patent
Sasayama

(10) Patent No.: US 10,338,797 B2
(45) Date of Patent: Jul. 2, 2019

(54) INFORMATION PROCESSING APPARATUS AND INFORMATION PROCESSING METHOD

(71) Applicant: Kazuki Sasayama, Kanagawa (JP)

(72) Inventor: Kazuki Sasayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

(21) Appl. No.: 15/255,264

(22) Filed: Sep. 2, 2016

(65) Prior Publication Data
US 2017/0075554 A1    Mar. 16, 2017

(30) Foreign Application Priority Data
Sep. 15, 2015 (JP) .................. 2015-182047

(51) Int. Cl.
G06F 3/0484 (2013.01)
G06F 3/0482 (2013.01)
H04N 1/00 (2006.01)
G06F 3/0488 (2013.01)

(52) U.S. Cl.
CPC ........ *G06F 3/04847* (2013.01); *G06F 3/0482* (2013.01); *G06F 3/04845* (2013.01); *G06F 3/04886* (2013.01); *H04N 1/00* (2013.01); *H04N 1/0035* (2013.01); *H04N 1/0044* (2013.01); *H04N 1/00408* (2013.01); *H04N 1/00411* (2013.01); *H04N 1/00419* (2013.01); *H04N 1/00424* (2013.01); *H04N 1/00453* (2013.01); *H04N 1/00456* (2013.01); *G06F 2203/04806* (2013.01)

(58) Field of Classification Search
CPC ............... G06F 3/0482; G06F 3/04845; G06F 3/04847; G06F 2203/04806; G06F 3/04886; G06F 3/12; G06F 9/4443; G06F 3/0481; G06F 3/0484; H04N 1/00; H04N 5/44591; G09G 5/14
See application file for complete search history.

(56) References Cited

U.S. PATENT DOCUMENTS 8,223,172 B1 * 7/2012 Miller .................. G06F 3/0481
345/660
8,300,237 B2 10/2012 Sugi
8,533,614 B2 9/2013 Katsumata
(Continued)

FOREIGN PATENT DOCUMENTS

JP    2009-017340    1/2009
JP    2009-048397    3/2009

*Primary Examiner* — Jennifer N To
*Assistant Examiner* — Reji Kartholy
(74) *Attorney, Agent, or Firm* — IPUSA, PLLC

(57) ABSTRACT

An information processing apparatus is provided that includes a memory storing a program, and a processor configured to execute the program to implement processes of accepting an operation with respect to a setting screen that displays an image including a plurality of display components corresponding to a plurality of setting items on a display device, and accepting a setting operation for enlarging or reducing a display size of at least one display component of the plurality of display components and changing display information that is displayed in a display area of the at least one display component according to the display size of the at least one display component.

9 Claims, 26 Drawing Sheets

(56) References Cited

U.S. PATENT DOCUMENTS

| | | | | |
|---|---|---|---|---|
| 8,952,991 | B1* | 2/2015 | Kelley | G06Q 10/109 |
| | | | | 345/619 |
| 2012/0229518 | A1* | 9/2012 | Chowdhry | G09G 5/14 |
| | | | | 345/660 |
| 2014/0089828 | A1* | 3/2014 | Okuma | G03G 15/5016 |
| | | | | 715/765 |
| 2015/0244884 | A1* | 8/2015 | Sensu | H04N 1/00411 |
| | | | | 358/1.13 |
| 2015/0347876 | A1* | 12/2015 | Matsuura | G09G 5/32 |
| | | | | 345/472 |
| 2016/0295040 | A1* | 10/2016 | Shigenobu | H04N 1/00424 |
| 2016/0306537 | A1* | 10/2016 | Okumura | G06F 3/048 |
| 2017/0094121 | A1* | 3/2017 | Mizuno | G06F 21/45 |

* cited by examiner

FIG.10A 431-1

| SETTING OBJECT | MAGNIFICATION [%] |
|---|---|
| OVERALL | 50 |
| COLOR/BLACK & WHITE | 100 |
| DIRECTIONAL MAGNIFICATION | 100 |
| NUMBER OF COPIES | 100 |

FIG.10B 431-2

| SETTING OBJECT | MAGNIFICATION [%] |
|---|---|
| OVERALL | 250 |
| COLOR/BLACK & WHITE | 100 |
| DIRECTIONAL MAGNIFICATION | 100 |
| NUMBER OF COPIES | 100 |

FIG.10C 431-3

| SETTING OBJECT | MAGNIFICATION [%] |
|---|---|
| OVERALL | 100 |
| COLOR/BLACK & WHITE | 250 |
| DIRECTIONAL MAGNIFICATION | 100 |
| NUMBER OF COPIES | 100 |

FIG.11

| SETTING ITEM \ DISPLAY INFORMATION | 10~50 | 51~200 | 201~ (MAGNIFICATION) | |
|---|---|---|---|---|
| COLOR/BLACK & WHITE | SETTING VALUE | SETTING ITEM NAME, SETTING VALUE | SETTING ITEM NAME, SELECTABLE SETTING VALUES, SELECTED SETTING VALUE, SETTING COMPONENTS (AUTO COLOR, BLACK & WHITE, FULL COLOR) | |
| DIRECTIONAL MAGNIFICATION | SETTING VALUE (DIRECTIONAL MAGNIFICATION) | SETTING ITEM NAME, SETTING VALUE | SETTING ITEM NAME, SETTING VALUE, SETTING COMPONENTS (PAPER SIZE) | |
| NUMBER OF COPIES | SETTING VALUE (NUMBER OF COPIES) | SETTING ITEM NAME, SETTING VALUE | SETTING ITEM NAME, SETTING VALUE, SETTING COMPONENTS | |

| SETTING ITEM | SETTING VALUE |
|---|---|
| COLOR/BLACK & WHITE | AUTO COLOR |
| | BLACK & WHITE |
| | FULL COLOR |
| NUMBER OF COPIES | NUMBER OF COPIES |
| SORT/STACK | SORT |
| | SHIFT STACK |
| | ROTATE SORT |
| | NO SORT STACK |
| DIRECTIONAL MAGNIFICATION | PAPER SIZE (A3, LETTER, A4, ENVELOPE) |
| | RATIO SETTING (50%, 70%, EQUAL, 120%, 150%) |
| STAPLE | UPPER LEFT |
| | UPPER LEFT DIAGONAL |
| | UPPER RIGHT |
| | UPPER RIGHT DIAGONAL |
| | NO STAPLE |
| HOLE PUNCH | UPPER LEFT ONE HOLE |
| | LEFT TWO HOLES |
| | RIGHT TWO HOLES |
| | TOP TWO HOLES |
| | NO HOLES |
| DIVIDE | DIVIDE |
| BOOKLET | MAGAZINE (LEFT-SIDE BOUND) |
| | MAGAZINE (RIGHT-SIDE BOUND) |
| | MINI BOOKLET (LEFT-SIDE BOUND) |
| | MINI BOOKLET (RIGHT-SIDE BOUND) |
| DOUBLE PAGE SPREAD | DOUBLE PAGE SPREAD |
| PRINT | PRINT |

FIG.16

| SETTING ITEM \ DISPLAY INFORMATION | USER ID: USER A |||
|---|---|---|---|
| | MAGNIFICATION |||
| | 10~50 | 51~200 | 201~ |
| COLOR/BLACK & WHITE | SETTING ITEM NAME | SETTING ITEM NAME, SETTING VALUE | SETTING ITEM NAME, SETTING VALUE, SETTING COMPONENTS (AUTO COLOR, BLACK & WHITE, FULL COLOR) |
| DIRECTIONAL MAGNIFICATION | SETTING VALUE (DIRECTIONAL MAGNIFICATION) | SETTING ITEM NAME, SETTING VALUE | SETTING ITEM NAME, SETTING VALUE, SETTING COMPONENTS (RATIO SETTING) |
| NUMBER OF COPIES | SETTING VALUE (NUMBER OF COPIES) | SETTING ITEM NAME, SETTING VALUE | SETTING ITEM NAME, SETTING VALUE, SETTING COMPONENTS |

432A

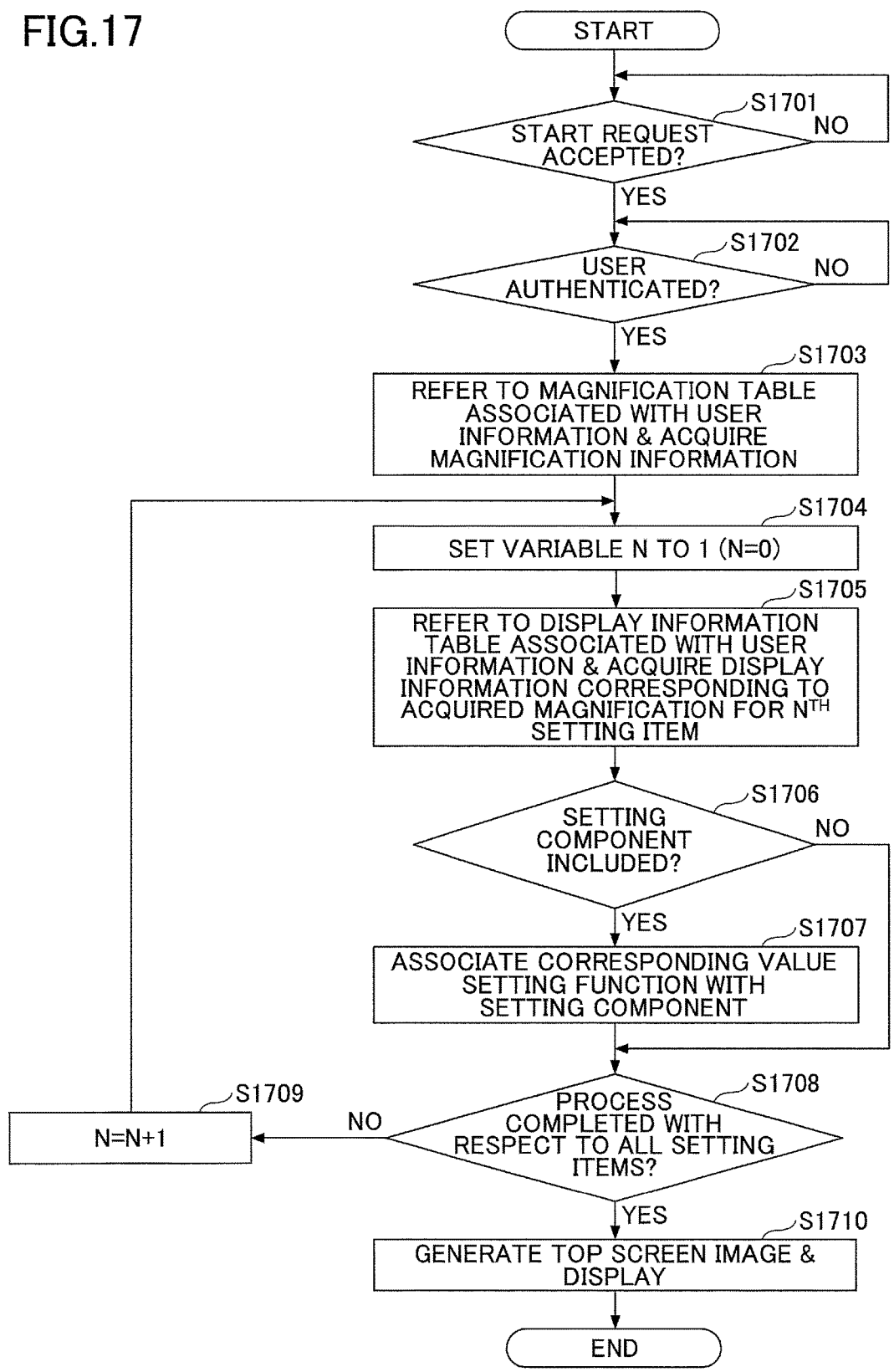

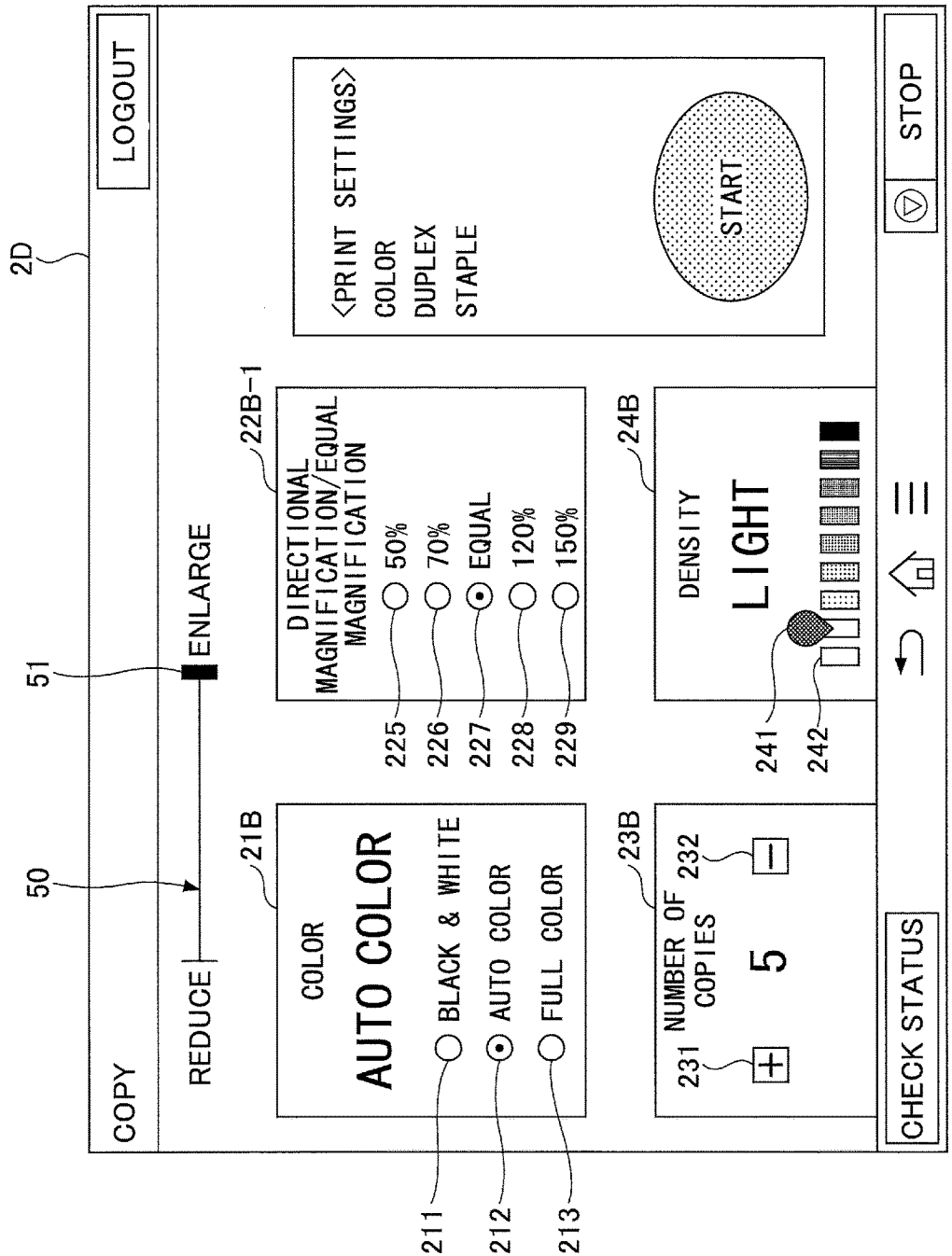

FIG.23

| APPLICATION NAME \ DISPLAY INFORMATION | MAGNIFICATION | | |
|---|---|---|---|
| | 10~50 | 51~200 | 201~ |
| COPY | APPLICATION NAME | APPLICATION NAME EXECUTION INSTRUCTION COMPONENT (START) | APPLICATION NAME EXECUTION INSTRUCTION COMPONENT (START) SETTING INSTRUCTION COMPONENT (NUMBER OF COPIES, COLOR) |
| SCAN | APPLICATION NAME | APPLICATION NAME SETTING INSTRUCTION COMPONENT (DESTINATION) EXECUTION INSTRUCTION COMPONENT (START) | APPLICATION NAME EXECUTION INSTRUCTION COMPONENT (START) SETTING INSTRUCTION COMPONENT (DESTINATION 1, 2) |
| FAX | APPLICATION NAME | APPLICATION NAME SETTING INSTRUCTION COMPONENT (DESTINATION) EXECUTION INSTRUCTION COMPONENT (START) | APPLICATION NAME EXECUTION INSTRUCTION COMPONENT (START) SETTING INSTRUCTION COMPONENT (DESTINATION 1, 2) |

| APPLICATION | OPERATION TYPE | 633 |
|---|---|---|
| COPY | START | |
| | STOP | |
| | COLOR SETTING | |
| | DIRECTIONAL MAGNIFICATION SETTING | |
| | NUMBER OF COPIES SETTING | |
| | DENSITY SETTING | |
| | PAPER FEED TRAY SETTING | |
| SCAN | START | |
| | STOP | |
| | DESTINATION REGISTRATION SETTING | |
| FAX | START | |
| | STOP | |
| | DESTINATION SETTING | |

INFORMATION PROCESSING APPARATUS AND INFORMATION PROCESSING METHOD

CROSS-REFERENCE TO RELATED APPLICATIONS

The present application claims priority under 35 U.S.C. § 119 to Japanese Patent Application No. 2015-182047 filed on Sep. 15, 2015, the entire contents of which are incorporated herein by reference.

BACKGROUND OF THE INVENTION

1. Field of the Invention

The present invention relates to an information processing apparatus and an information processing method.

2. Description of the Related Art

Techniques are known for displaying a setting screen on a touch panel of an image processing apparatus to enable a user to set up various settings by operating display components corresponding to setting items, for example. Also, techniques are known for editing contents of an operation screen to be displayed on a display apparatus (see e.g., Japanese Unexamined Patent Publication No. 2009-17340).

SUMMARY OF THE INVENTION

According to one embodiment of the present invention, an information processing apparatus is provided that includes a memory storing a program, and a processor configured to execute the program to implement processes of accepting an operation with respect to a setting screen that displays an image including a plurality of display components corresponding to a plurality of setting items on a display device, and accepting a setting operation for enlarging or reducing a display size of at least one display component of the plurality of display components and changing display information that is displayed in a display area of the at least one display component according to the display size of the at least one display component.

BRIEF DESCRIPTION OF THE DRAWINGS

FIGS. 10A-10C illustrate examples of magnification tables according to the first embodiment;
FIG. 11 illustrates an example of a display information table according to the first embodiment;
FIG. 12 illustrates an example of a setting item table according to the first embodiment;
FIG. 16 illustrates an example of the display information table according to the second embodiment;
FIG. 17 is a flowchart illustrating an operation of the copy process unit according to the second embodiment;
FIG. 18 is a diagram illustrating an example of the top screen of the copy application according to the second embodiment;
FIG. 23 illustrates an example of the display information table according to the third embodiment;
FIG. 24 illustrates an example of an application table according to the third embodiment.

DESCRIPTION OF THE EMBODIMENTS

According to one aspect of the present invention, a technique is provided for improving operability of an information processing apparatus.

In the following, embodiments of the present invention are described with reference to the accompanying drawings.

First Embodiment

Figure 1:
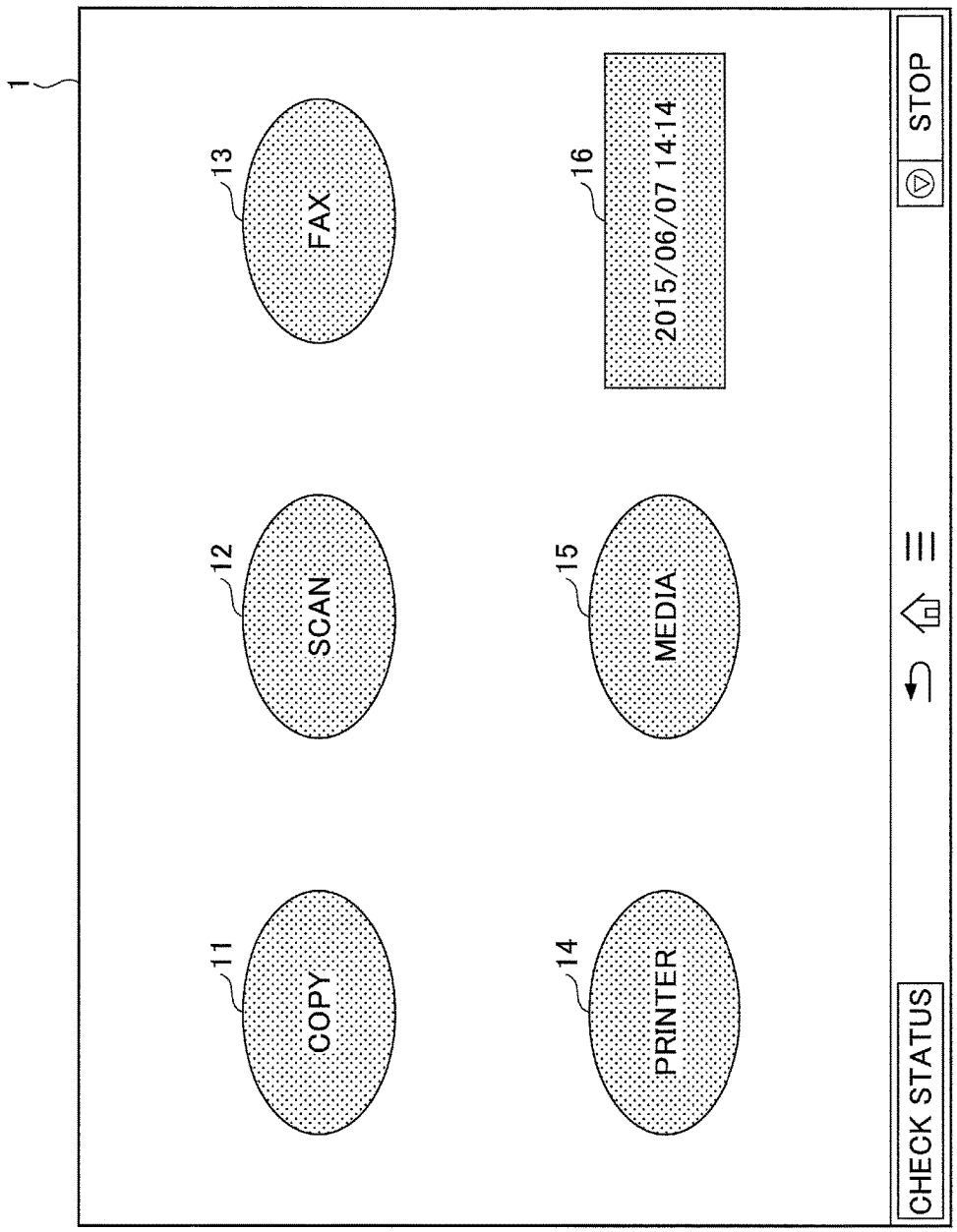
FIG. 1 is a diagram illustrating a home screen according to a first embodiment of the present invention.

In the following, a first embodiment of the present invention is described. FIG. 1 is a diagram illustrating a home screen 1 according to the first embodiment.

The home screen 1 of FIG. 1 is displayed on an operation panel of an operation apparatus included in an image processing apparatus according to the present embodiment. The home screen 1 of the present embodiment displays display components (icons) 11-15 corresponding to applications for implementing various functions of the image processing apparatus.

In the present embodiment, a home screen image is generated and the operation panel is controlled to display a corresponding display area of the home screen image as the home screen 1. The display components 11-15 are images included in the home screen.

The display component 11 corresponds to a copy application for implementing a copy function, the display component 12 corresponds to a scan application for implementing a scan function, and the display component 13 corresponds to a fax application for implementing a fax function.

The display component 14 corresponds to a printer application for implementing a printer function, and the display component 15 corresponds to a media application for implementing a media function. Note that the media function refers to a function of the image processing apparatus for reading information stored in a portable recording medium and performing various processes on the information.

Also, the home screen 1 of the present embodiment includes a display component 16 indicating the current time/date. Further, the home screen 1 may include other display components such as a widget, for example.

In the image processing apparatus of the present embodiment, when one of the display components 11-15 displayed on the home screen 1 is selected, the application corresponding to the selected display component is started, and a top screen for the selected application is displayed.

The top screen for each application displays display components corresponding to setting items for the corresponding application. In the present embodiment, the size of each display component displayed on the top screen can be enlarged or reduced.

In the following, an example case is described in which the display component 11 displayed on the home screen 1 is selected. In this case, the copy application is started and a top screen for the copy application is displayed.

Figure 2:
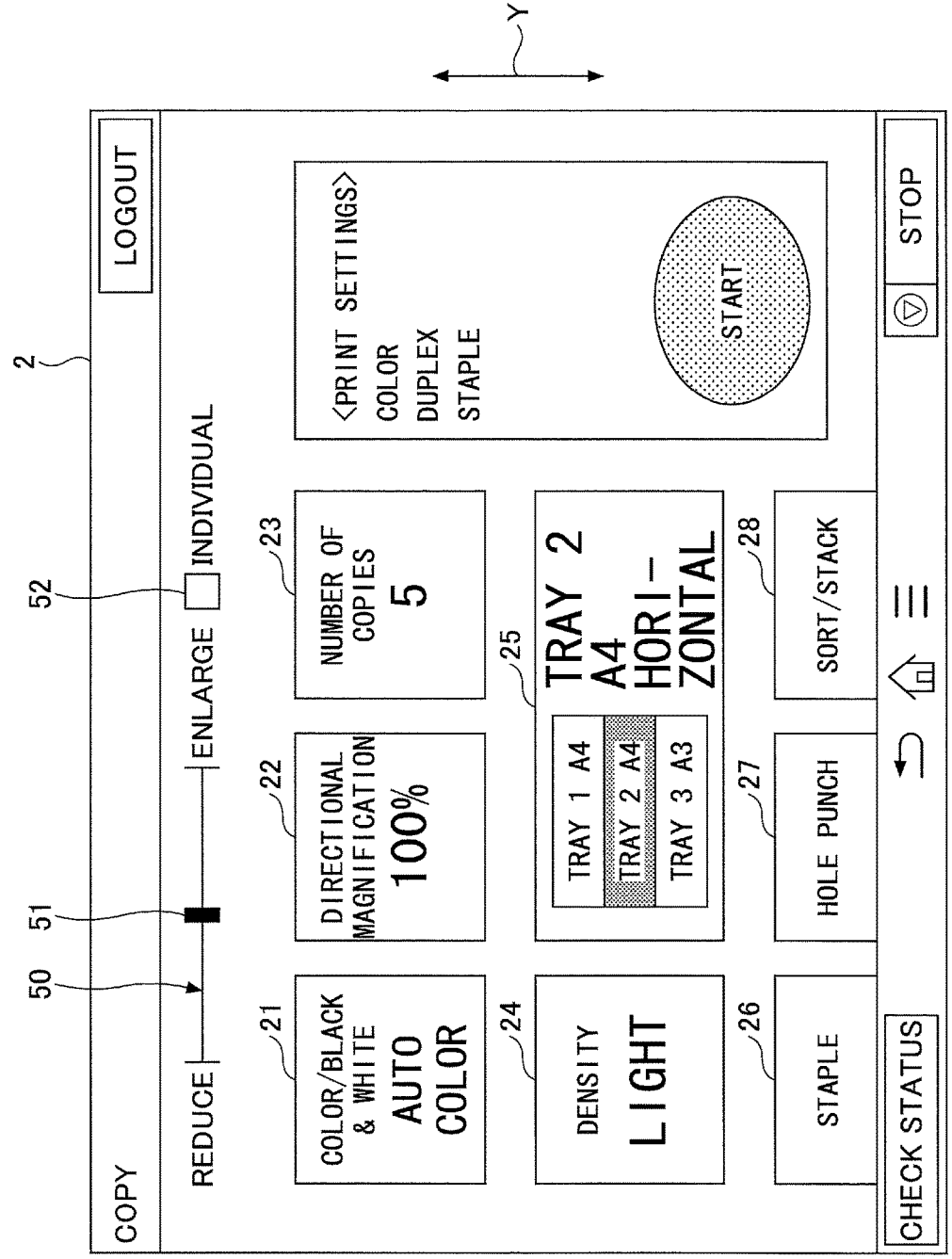
FIG. 2 is diagram illustrating a first example of a top screen of a copy application according to the first embodiment.

FIG. 2 is a diagram illustrating a first example of the top screen for the copy application according to the first embodiment.

The top screen 2 of FIG. 2 is a screen displayed on the operation panel of the operation apparatus included in the image processing apparatus. In the present embodiment, when the display component 11 displayed on the home screen 1 is operated (selected), the screen displayed on the operation panel transitions from the home screen 1 to the top screen 2. Note that in the present embodiment, operation of a display component may refer to touching the display component on the operation panel of the operation apparatus included in the image processing apparatus, for example.

The top screen 2 may be displayed by controlling the operation panel to display corresponding display area of a top screen image. The top screen image includes display components 21-28 corresponding to setting items related to the copy application included in the image processing apparatus. That is, the top screen 2 is one of a number of setting screens for the copy application.

In the top screen 2, the display components 21-25 are displayed and the display components 26-28 are partially displayed. In the top screen 2, each of the display components displays a setting item name corresponding to the display component and a setting value set up for the setting item.

Specifically, for example, the display component 21 displays "color/black & white" as the setting item name corresponding to the display component 21, and "auto color" as the setting value for the setting item. Similarly, the display component 22 displays "directional magnification" as setting item name corresponding to the display component 22, and "100%" as the setting value for the setting item.

That is, by displaying the display components on the top screen 2 according to the present embodiment, a list of setting items and corresponding setting values set up for the setting items may be displayed.

In the present embodiment, when an operation selecting one of the display components displayed on the top screen 2 is made, the screen displayed on the operation panel may transition to a detailed setting screen for the setting item corresponding to the display component selected from the top screen 2. In the detailed setting screen, a change may be made to the setting value set up for the corresponding setting item, for example.

Also, the top screen image of the present embodiment includes setting components 51 and 52 for setting the display size of the display components 21-28. The setting component 51 is for uniformly enlarging/reducing the display size of all the display components included in the top screen 2. In the following descriptions, such uniform enlargement/reduction setting of all the display components included in the top screen 2 is referred to as overall enlargement setting or overall reduction setting.

The setting component 52 is for individually enlarging/reducing the display size of each display component. In the following descriptions, such individual enlargement/reduction setting with respect to each individual display component is referred to as individual setting.

The setting components 51 and 52 of the present embodiment are images corresponding to setting display components for accepting a setting operation.

In the top screen 2, the display size of the display components 21-28 included in the top screen image may be changed by sliding the setting component 51 along an enlargement/reduction bar 50. In other words, the display size of the display areas of the display components 21-28 displayed on the top screen 2 may be changed.

More specifically, in the present embodiment, by moving the setting component 51 toward the enlargement side of the enlargement/reduction bar 50, an area of the top screen image displayed on the operation panel becomes smaller and the display areas of the display components displayed in the top screen become larger. That is, the individual display components of the top screen are enlarged. Also, in the present embodiment, by moving the setting component 51 toward the reduction side of the enlargement/reduction bar 50, an area of the top screen image displayed by the operation panel becomes larger, and the display areas of the individual display components displayed in the top screen become smaller. In other words, the display components in the top screen are reduced in size. Note that in the present embodiment, it is assumed that the top screen 2 illustrated in FIG. 2 corresponds to a reference screen (default screen) that is neither reduced nor enlarged.

Note that when a scrolling operation is made in the directions of arrow Y indicated at the right side of FIG. 2, for example, display components in the top screen image corresponding to the display area may be displayed on the operation panel according to a display position specified by the scrolling operation. That is, the top screen image may include display components other than the display components 21-28 displayed on the top screen 2.

Accordingly, when a scrolling operation is made with respect to the top screen 2, display components other than the display components 21-28 may be displayed on the top screen 2.

In the following, example cases in which the display size of the display areas of the display components displayed in the top screen 2 are enlarged/reduced are described with reference to FIGS. 3-5.

Figure 3:
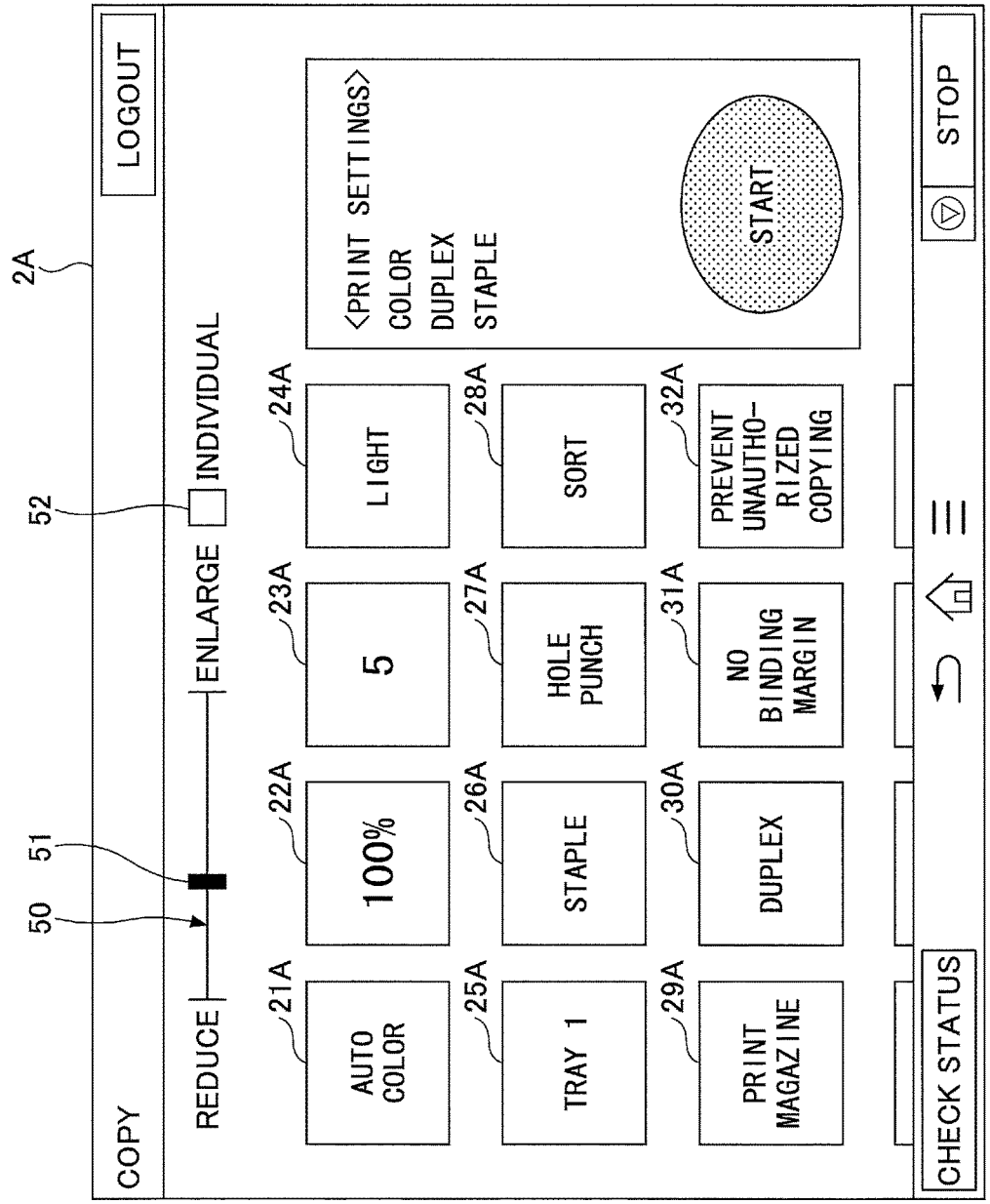
FIG. 3 is diagram illustrating a second example of the top screen of the copy application according to the first embodiment.

FIG. 3 is diagram illustrating a second example of the top screen of the copy application according to the first embodiment.

The top screen 2A of FIG. 3 illustrates an example case in which overall reduction setting is implemented by the setting component 51. In the top screen 2A, the setting component 51 is moved toward the reduction side of the enlargement/reduction bar 50, and as a result, reduced-size display components 21A-28A that are smaller than the display components 21-28 are displayed. Also, in the top screen 2A, a display area of the top screen image corresponding to the operation panel display is enlarged, and reduced-size display components 29A-32A that are not displayed on the top screen 2 are displayed.

Note that the reduced-size display components 21A-28A of the present embodiment only display the setting values for the corresponding setting items represented by the display components.

For example, the reduced-size display component 21A only displays the setting value "auto color" for the corresponding setting item "color/black & white". Similarly, the reduced-size display component 22A only displays the setting value "100%" for the corresponding setting item "directional magnification".

As described above, the amount of information displayed by each of the reduced-size display components displayed on the top screen 2A is smaller as compared with the information displayed by each of the display components displayed on the top screen 2.

Also, the number of reduced-size display components displayed on the top screen 2A of the present embodiment is greater than the number of display components displayed on the top screen 2. That is, the list of setting items displayed on the top screen 2A includes a greater number of setting items and their corresponding setting values as compared with the top screen 2.

As described above, in the present embodiment, a greater number of display components corresponding to setting items may be displayed on a top screen by reducing the size of the display components displayed on the top screen. Thus, setting the setting component 51 toward the reduction side of the enlargement/reduction bar 50 may be useful for users who wish to display a more detailed list of setting items on the top screen, for example.

Figure 4:
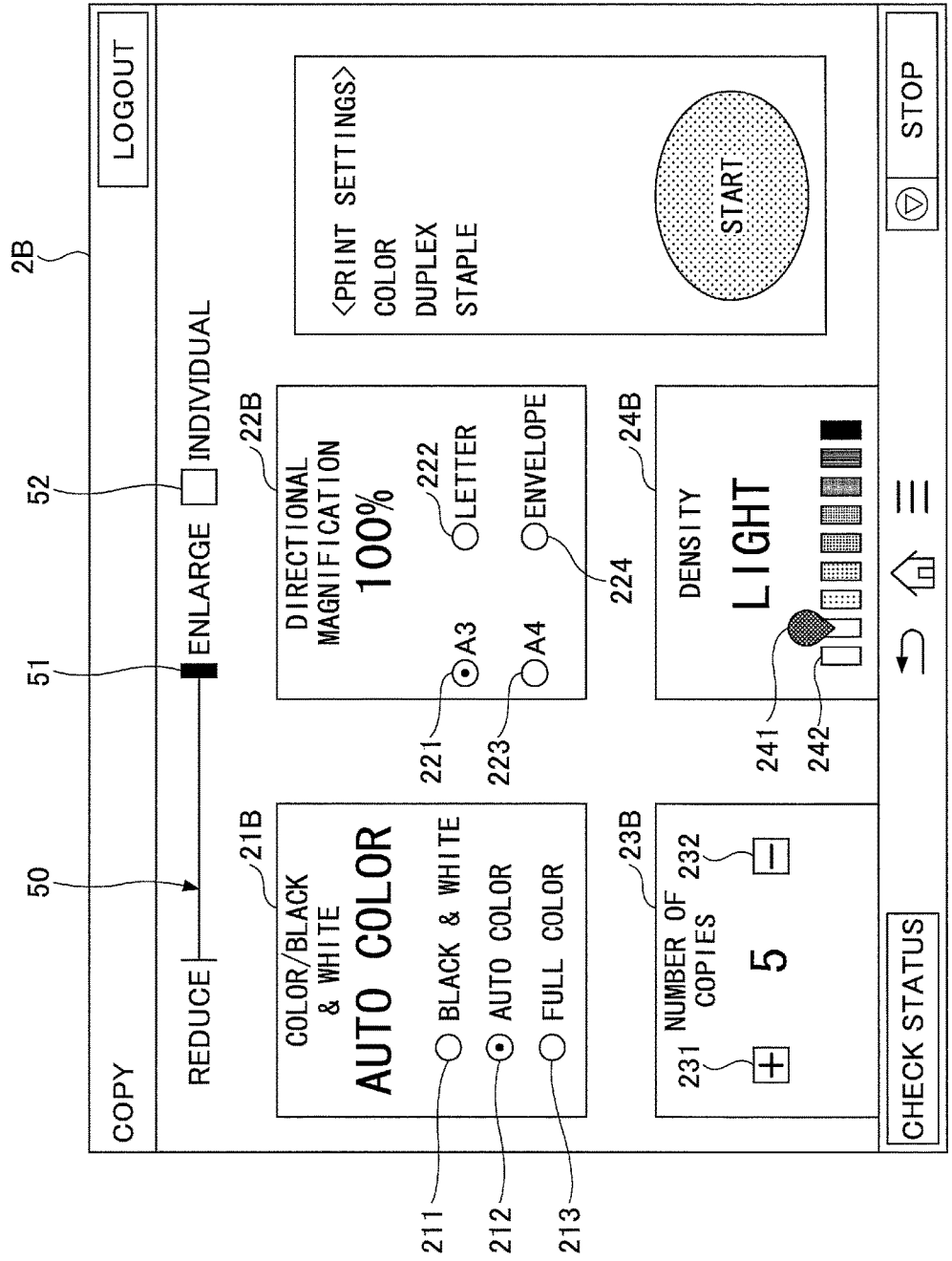
FIG. 4 is diagram illustrating a third example of the top screen of the copy application according to the first embodiment.

FIG. 4 is a diagram illustrating a third example of the top screen for the copy application according to the first embodiment.

The top screen 2B of FIG. 4 illustrates an example case in which overall enlargement setting is implemented by the setting component 51. In the top screen 2B, the setting component 51 is moved toward the enlargement side of the enlargement/reduction bar 50, and as a result, enlarged display components 21B and 22B and parts of enlarged display components 23B and 24B corresponding to enlarged versions of the display components 21-24 are displayed. Also, in the top screen 2B, a display area of the top screen image corresponding to the operation panel display is reduced such that display components 25-28 displayed on the top screen 2 are not displayed on the top screen 2B.

Also, each of the enlarged display components 21B-24B of the present embodiment display the setting item name corresponding to the display component, the setting value for the setting item, and one or more setting components for setting the setting value for the setting item.

For example, the enlarged display component 21B displays "color/black & white" as the setting item name corresponding to the enlarged display component 21B, "auto color" as the setting value for the setting item, and setting items 211, 212, and 213 for setting the setting value for the setting item "color/black & white".

The setting component 211 corresponds to the setting value "black & white" of the setting item "color/black & white". The setting item 212 corresponds to the setting value "auto color" of the setting item "color/black & white". The setting component 213 correspond to the setting value "full color" of the setting item "color/black & white".

For example, when an operation selecting the setting component 211 is made with respect to the enlarged display component 21B, the setting value "black & white" corresponding to the setting component 211 is set up for the setting item "color/black & white".

Also, the enlarged display component 22B displays "directional magnification" as the setting item name corresponding to the enlarged display component 22B, "100%" as the setting value for the setting item, and setting components 221-224 for setting the setting value of the setting item "directional magnification".

Note that the setting components 221-224 displayed on the enlarged display component 22B are setting components for setting up a directional magnification setting for fitting (resizing) an image to a specified paper size.

The setting component 221 corresponds to the setting value "A3" of the setting item "directional magnification". The setting component 222 corresponds to the setting value "letter" of the setting item "directional magnification". The setting component 223 corresponds to the setting value "A4" of the setting item "directional magnification". The setting component 224 corresponds to the setting value "envelope" of the setting item "directional magnification".

For example, when an operation selecting the setting component 223 is made with respect to the enlarged display component 22B, the setting value "A3" corresponding to the setting component 223 is set up for the setting item "directional magnification". In this case, when an image being processed by the image processing apparatus is in a size other than A3 size, the image processing apparatus performs a directional magnification operation for fitting (resizing) the image into A3 size and outputs the resulting resized image.

The enlarged display component 23B displays "number of copies" as the setting item name corresponding to the enlarged display component 23B, "5" as the setting value for the setting item, and setting components 231 and 232 for setting up the setting value for the setting item "number of copies". The enlarged display component 24B displays "density" as the setting item name corresponding to the enlarged display component 24B, "light" as the setting value for the setting item, and setting components 241 and 242 for setting up the setting value for the setting item "density".

As described above, a greater amount of information is displayed by each of the enlarged display components displayed on the top screen 2B as compared with the amount of information displayed by each of the display components displayed on the top screen 2.

Also, the number of enlarged display components displayed on the top screen 2B of the present embodiment is less than the number of display components displayed on the top screen 2. That is, the list of setting items displayed on the top screen 2B includes a smaller number of setting items as compared with the list displayed on the top screen 2.

As described above, in the present embodiment, more information relating to each setting item corresponding to a display component may be displayed on the top screen by enlarging the display components displayed on the top screen. Also, by enlarging the display components, setting values for the corresponding setting items may be set up using the setting components displayed within the enlarged display components. That is, setting values may be changed by operating the setting components displayed within the display areas of the display components displayed on the top screen.

Thus, by moving the setting component 51 toward the enlargement side of the enlargement/reduction bar 50, a user may be able to change the setting value of a setting item without transitioning the top screen 2 to a detailed setting screen for the setting item, for example.

Figure 5:
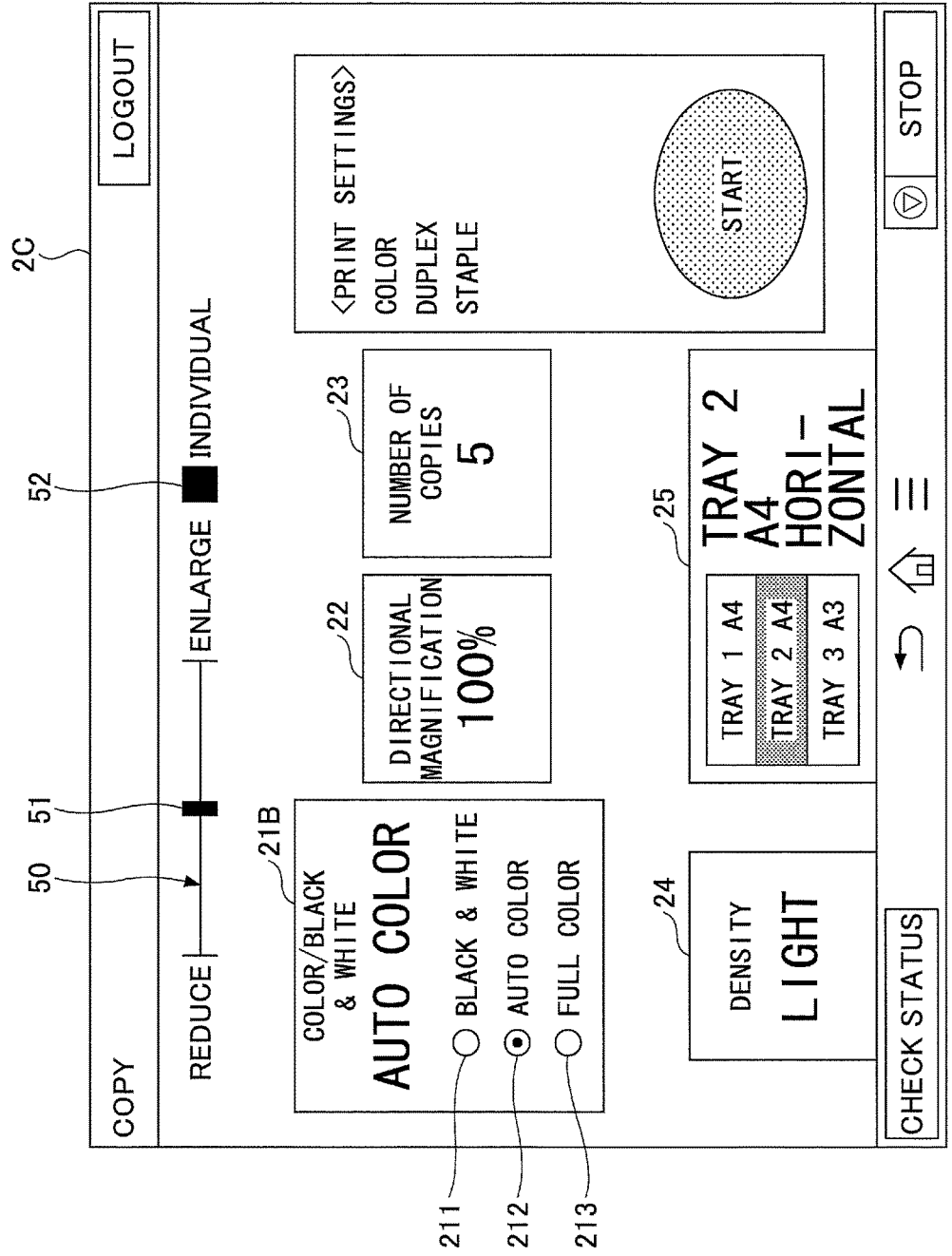
FIG. 5 is diagram illustrating a fourth example of the top screen of the copy application according to the first embodiment.

FIG. 5 is a diagram illustrating a fourth example of the top screen for the copy application according to the first embodiment.

The top screen 2C of FIG. 5 illustrates a case where the setting component 52 is used to implement individual setting of a display component. In the top screen 2C, when the setting component 52 is selected, a display component may be individually enlarged by performing a pinch-out operation with respect to the display component, for example.

In the top screen 2C of FIG. 5, the display component 21 is enlarged to be displayed as the enlarged display component 21B. The enlarged display component 21B displayed on the top screen 2C is identical to the enlarged display component 21B displayed on the top screen 2B, and displays the setting components 211, 212, and 213.

The display components 22-25 displayed on the top screen 2C of FIG. 5 are identical to the display components 22-25 displayed on the top screen 2 of FIG. 2.

As described above, in the top screen 2C, individual setting of a display component may be implemented such that a selected display component may be individually enlarged to display setting components for the corresponding setting item, for example. Thus, in the present embodiment, for example, only a display component corresponding to a setting item that is frequently changed may be displayed as an enlarged display component so that the operation panel 205 would not have to transition from the top screen 2C to a detail setting screen every time the setting value of the setting item corresponding to the enlarged display component is to be changed. In this way, operation convenience may be improved, for example.

Note that in the present embodiment, overall enlargement/reduction setting by the setting component 51 and individual setting by the setting component 52 may be implemented at the same time, for example.

Specifically, for example, after implementing overall reduction setting with respect to the top screen 2 to obtain the top screen 2A as illustrated in FIG. 3, individual setting may be implemented with respect to the reduced-size display component 21A so that the corresponding display component may be displayed as the display component 21 or the enlarged display component 21B, for example. Also, although individual setting for enlarging a display component using the setting component 52 is described in the above example, the individual setting also includes reducing the size of an individual display component. In the case of individually reducing the size of a display component, a pinch-in operation may be performed with respect to the display component. For example, the setting component 52 displayed on the top screen 2 may be selected, and the display component 21 may be individually reduced in size by a pinch-in operation to be displayed as the reduced-size display component 21A.

Figure 6:
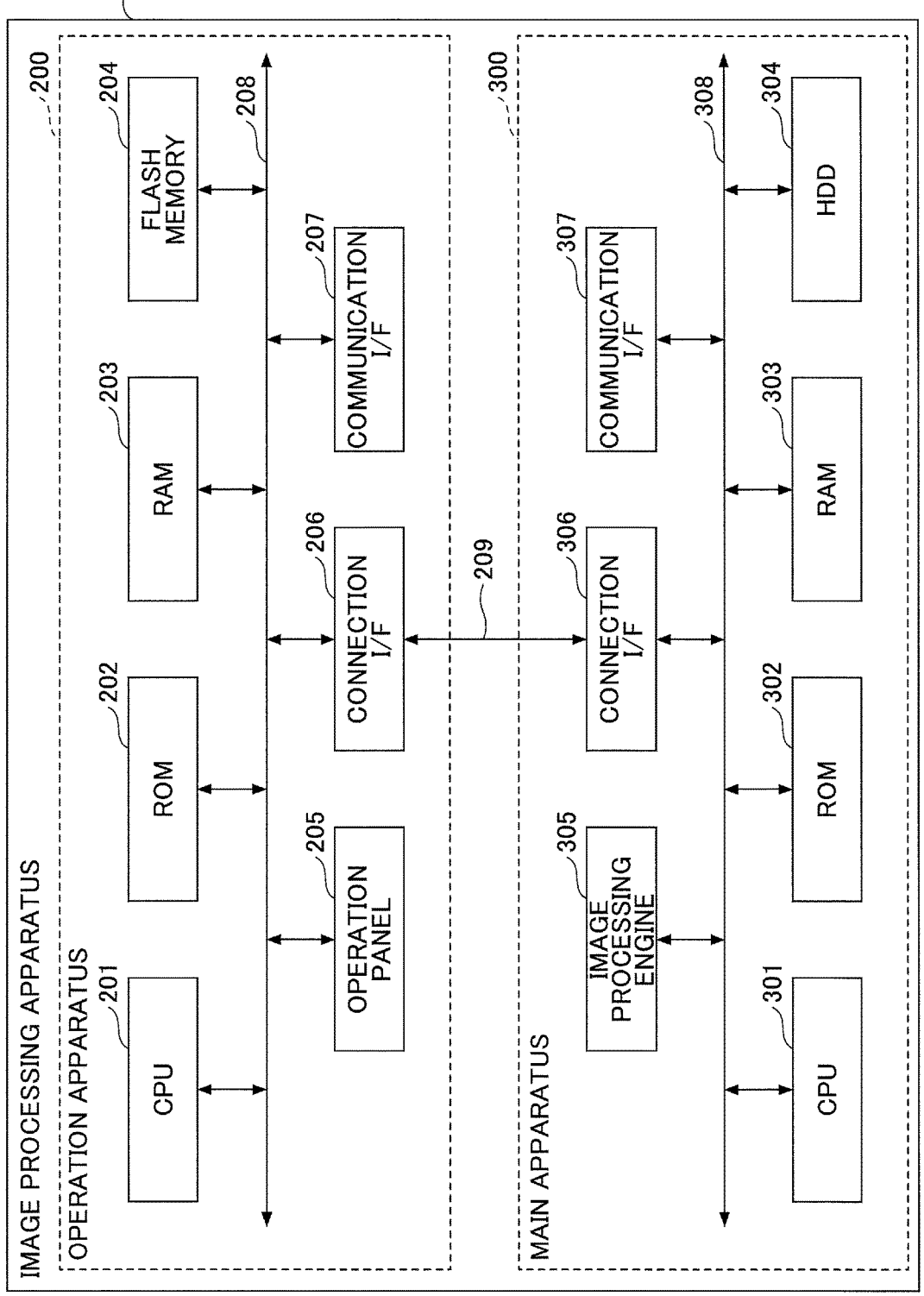
FIG. 6 is a block diagram illustrating an example hardware configuration of an image processing apparatus.

In the following, the image processing apparatus according to the present embodiment is described. FIG. 6 is a block diagram illustrating an example hardware configuration of the image processing apparatus according to the present embodiment.

The image processing apparatus 100 of the present embodiment is a multifunctional peripheral (MFP) including multiple functions, such as a copy function, a scan function, a fax function, an image processing function, and a printer function, for example.

As illustrated in FIG. 6, the image processing apparatus 100 includes an operation apparatus 200 and a main apparatus 300.

The operation apparatus 200 is used by a user to perform various operations, such as selecting an image processing function to be implemented by the main apparatus 300, inputting various setting values for implementing the image processing function, inputting an instruction to execute a process for implementing the image processing function, or switching a display screen, for example.

The main apparatus 300 executes various processes for implementing an image processing function in response to various operations made by the user using the operation apparatus 200, for example. The main apparatus 300 also sends requests to the operation apparatus 200 for displaying various messages.

The operation apparatus 200 of the embodiment includes a CPU (Central Processing Unit) 201, a ROM (Read Only Memory) 202, and a RAM (Random Access Memory) 203. Further, the operation apparatus 200 includes a flash memory 204, an operation panel 205, a connection I/F 206, and a communication I/F 207. These hardware elements are connected to each other via a bus 208.

The CPU 201 is a computing unit (processor) that controls the entire operation apparatus 200 by executing various programs stored in the ROM 202 or the flash memory 204 using the RAM 203 as a working area.

The ROM 202 is a non-volatile semiconductor memory (storage device) capable of holding data even when the power is turned off. The RAM 203 is a volatile semiconductor memory (storage device) for temporarily storing programs and data.

The flash memory 204 is a non-volatile storage medium storing various programs to be executed by the CPU 201 (e.g., a program for implementing the present embodiment) and various data.

The operation panel 205 may be a touch panel, for example, and is used by the user to perform various operations. Further, the operation panel 205 displays various messages. That is, the operation panel 205 may display a GUI (Graphical User Interface) display screen for enabling the user to perform various operations for implementing various functions of the image processing apparatus 100 and information relating to the processing result of the image processing apparatus 100 (e.g., error message, guidance message).

The connection I/F 206 is an interface for establishing communication with the main apparatus 300 via a communication path 209. The connection I/F 206 may be an interface conforming to the USB (Universal Serial Bus) standard, for example.

The communication I/F 207 is an interface for establishing communication with other devices. The communication I/F 207 may be wireless LAN conforming to the Wi-Fi standard, for example.

The main apparatus 300 of the present embodiment includes a CPU 301, a ROM 302, and a RAM 303. The main apparatus 300 also includes a HDD (Hard Disk Drive) 304, an image processing engine 305, a connection I/F 306, and a communication I/F 307. These hardware elements are connected to each other via a bus 308.

The CPU 301 is a computing unit (processor) that controls the entire main apparatus 300 by executing various programs stored in the ROM 302 or the HDD 304 using the RAM 303 as a working area.

The ROM 302 is a non-volatile semiconductor memory (storage device) capable of holding data even when the power is turned off. The RAM 303 is a volatile semiconductor memory (storage device) for temporarily storing programs and data.

The HDD 304 is a non-volatile storage medium storing various programs to be executed by the CPU 301 (e.g., a program for implementing the present embodiment) and various data.

The image processing engine 305 is hardware for performing image processes for implementing various image processing functions, such as a copy function, a scan function, a fax function, and a printer function, for example.

The image processing engine 305 may include a scanner that generates image data by optically scanning a document, a plotter that prints an image on sheet material such as paper, and facsimile communication device for performing facsimile communication, for example. Further, the image processing engine 305 may include a finisher that sorts printed sheets and/or an ADF (automatic document feeder) that automatically feeds a document.

The connection I/F 306 is an interface for establishing communication with the operation apparatus 200 via the communication path 209. The connection I/F 306 may be an interface conforming to the USB standard, for example.

The communication I/F 307 is an interface for establishing communication with other devices. The communication I/F 307 may be a wireless LAN conforming to the Wi-Fi standard, for example.

The image processing apparatus 100 of the present embodiment may implement various processes as described below using the above-described hardware elements.

Note that although FIG. 6 illustrates a configuration in which the image processing apparatus 100 includes the operation apparatus 200, the present invention is not limited thereto. In other examples, an information processing terminal, such as a tablet terminal, a smart phone, a mobile phone, or a PDA (personal digital assistant) may be used as the operation apparatus 200. That is, such information processing terminal may be configured to control the image forming apparatus 100 by communicating with the image processing apparatus 100 via the communication I/F 207 of the operation apparatus 200 or the communication I/F 307 of the main apparatus 300, for example.

Figure 7:
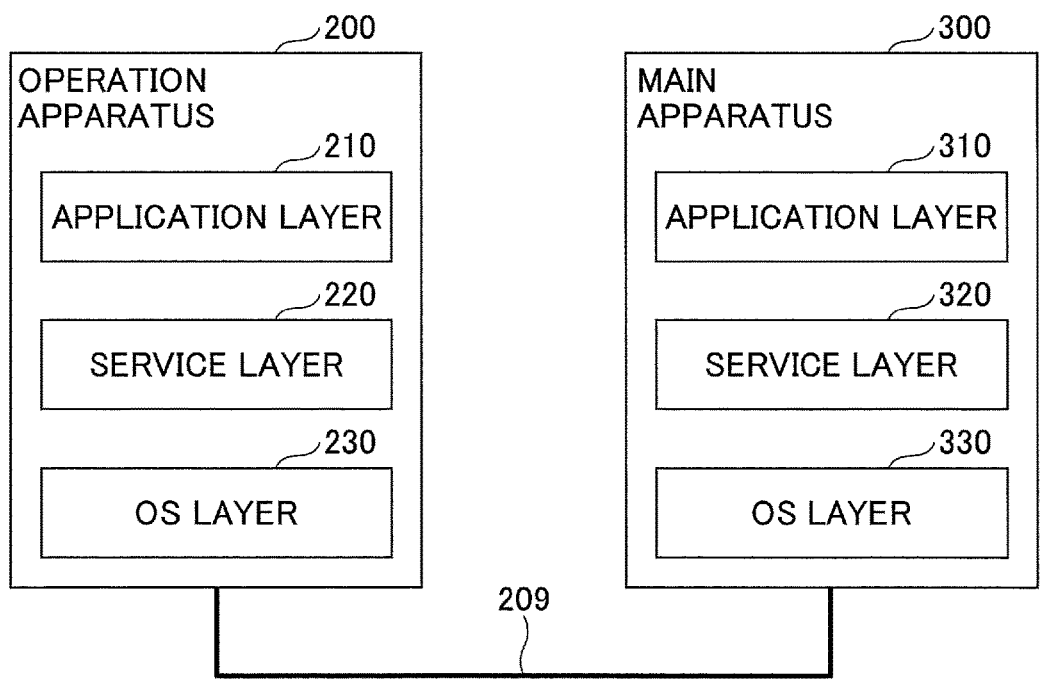
FIG. 7 is a diagram illustrating example hierarchical structures of groups of programs included in an operation apparatus and a main apparatus of the image processing apparatus.

In the following, referring to FIG. 7, the hierarchical structures of groups of programs included in the operation apparatus 200 and the main apparatus 300 of the image processing apparatus 100 are be described. FIG. 7 is a diagram illustrating example hierarchical structures of groups of programs included in the operation apparatus 200 and the main apparatus 300 of the image processing apparatus 100.

FIG. 7 illustrates the hierarchical structure of a group of programs included in the operation apparatus 200, and the hierarchical structure of a group of programs included in the main apparatus 300.

The group of programs included in the operation apparatus 200 may be stored in the ROM 202, or the flash memory 204, for example. The group of programs included in the main apparatus 300 may be stored in the ROM 302 or the HDD 304, for example.

First, the hierarchical structure of the group of programs included in the main apparatus 300 is described below. The group of programs included in the main apparatus 300 can be roughly divided into an application layer 310, a service layer 320, and an OS (Operating System) layer 330.

A program categorized into the application layer 310 is a program for implementing an image processing function by operating hardware resources of the main apparatus 300. Specific examples of such a program include a copy application, a scan application, a fax application, and a printer application.

A program categorized into the service layer 320 is a program that is interposed between the application layer 310 and the OS layer 330. Such a program may implement the functions of an interface for enabling a program of the application layer 310 to use the hardware resources of the main apparatus 300 and/or providing notification of the status of the hardware resources of the main apparatus 300, for example.

Specifically, a program of the service layer 320 may accept an operation request directed to a hardware resource of the main apparatus 300 and act as an intermediary for the accepted operation request. Also, a program of the service layer 320 may send error information relating to an error detected in a hardware resource. Note that an operation request accepted by the service layer 320 may include, for example, an operation request for an image process to be implemented by the image process engine 305 (e.g., operation request for a scanning operation by a scanner, operation request for a printing operation by a plotter).

Note that a program categorized into the service layer 320 may similarly act as an interface with respect to the application layer 210 of the operation apparatus 200. That is, a program categorized into the application layer 210 of the operating device 200 may access the service layer 320 to operate the hardware resources of the main apparatus 300 and implement an image processing function.

A program categorized into the OS layer 330 is a program referred to as basic software, which provides basic functions for controlling the hardware resources of the main apparatus 300. A program categorized into the OS layer 330 accepts an operation request for operating a hardware resource from a program categorized into the application layer 310 via a program categorized into the service layer 320, and executes a process corresponding to the operation request. Also, by executing a program categorized into the OS layer 330, an error detected in hardware resources may be received by the program of the OS layer 330 and passed to the service layer 320 as the error information.

Next, the hierarchical structure of the group of programs is included in the operation apparatus 200 is described below. As with the main apparatus 300, the group of programs included in the operation apparatus 200 can also be roughly divided into an application layer 210, a service layer 220 and an OS layer 230.

However, functions provided by a program categorized into the application layer 210 of the operation apparatus 200 are different from the functions provided by a program of the application layer 310 of the main apparatus 300, and the types operation requests that can be accepted by a program categorized into the service layer 220 are different from those accepted by the service layer 320 of the main apparatus 300. A program categorized into the application layer 210 of the operation apparatus 200 mainly provides a user interface function for accepting various operations and displaying information.

In the present embodiment, it is assumed that the OS of the operation apparatus 200 and the OS of the main apparatus 300 operate independently. Also, note that the OS of the operation apparatus 200 and the OS of the main apparatus 300 do not have to be the same type of OS as long as the operation apparatus 200 and the main apparatus 300 are able to communicate with each other. For example, the operation apparatus 200 may use Android (registered trademark) as its OS while the main apparatus 300 may use Linux (registered trademark) as its OS.

That is, the image processing apparatus 100 may be a system including the operation apparatus 200 and the main apparatus 300 that are controlled by different operating systems. In this case, communication between the operation apparatus 200 and the main apparatus 300 would not be an inter-process communication within a single information processing apparatus but instead be communication between different information processing apparatuses. For example, such communication may be implemented when the operation apparatus 200 transmits operation information indicating various operations of a user accepted by the operation apparatus 200 to the main apparatus 300, and when the main apparatus 300 transmits a display request to the operation apparatus 200 for requesting the display of a display screen.

However, the image processing apparatus 100 of the present embodiment is not limited to a configuration in which different types of operating systems are used in the operation apparatus 200 and the main apparatus 300. That is, the present embodiment encompasses configurations in which the same type of OS is used in the operation apparatus 200 and the main apparatus 300. Further, the image processing apparatus 100 of the present embodiment is not limited to a configuration in which the OS of the operation apparatus 200 and the OS of the main apparatus 300 operate independently. That is, one OS may be operating on the operating device 200 and the main apparatus 300, for example.

Figure 8:
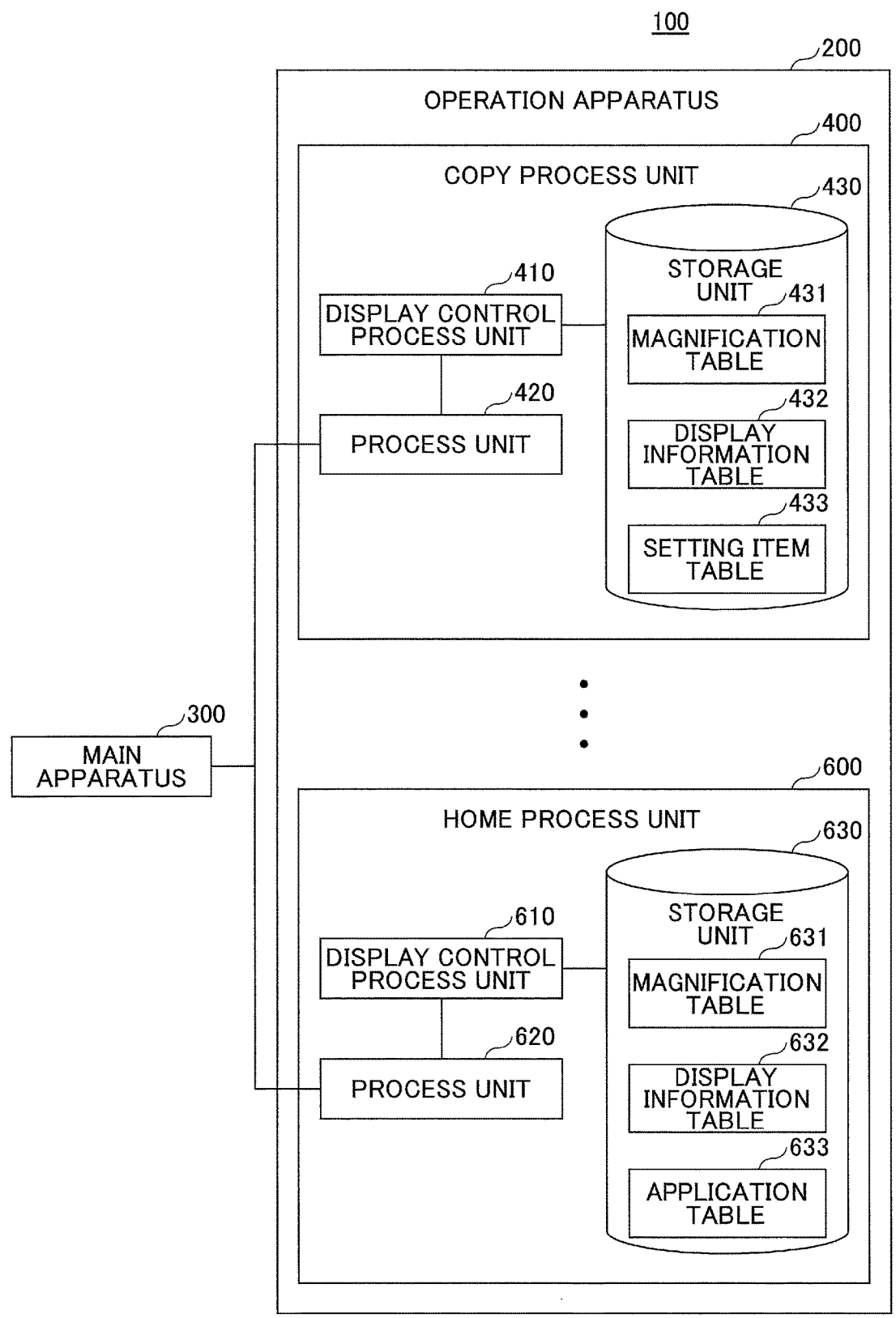
FIG. 8 is a block diagram illustrating an example functional configuration of the operation apparatus according to the first embodiment.

In the following, the functional configuration of the operation apparatus 200 of the present embodiment is described with reference to FIG. 8. FIG. 8 is a block diagram illustrating an example functional configuration of the operation apparatus 200 according to the first embodiment.

The operation apparatus 200 of the embodiment includes process units implemented by the CPU 210 executing various programs (applications) included in the application layer 210.

For example, the operation apparatus 200 includes a copy process unit 400. Also, the operation apparatus 200 includes a home process unit 600.

The copy process unit 400 of the present embodiment is implemented by a copy application included in the application layer 210.

The home process unit 600 of the present embodiment is implemented by a home application included in the application layer 210. In the present descriptions, a home application refers to an application for implementing functions relating to the home screen 1. Note that the functions relating to the home screen 1 include a display control function for controlling the display of the home screen 1.

Note that in addition to the process units illustrated in FIG. 8, the operation apparatus 200 of the present embodiment may include other various process units corresponding to applications included in the application layer 210, such as a scan application and a fax application, for example.

The copy process unit 400 of the present embodiment includes a display control process unit 410, a process unit 420, and a storage unit 430.

The display control process unit 410 controls the display of the operation panel 205 of the operation apparatus 200 when the copy application is activated. The process unit 420 sends various requests to the main apparatus 300 according to an operation accepted by the operation panel 205.

The storage unit 430 stores a magnification table 431, a display information table 432, and a setting item table 433. Each of the tables stored in the storage unit 430 is referenced by the display control unit 410. Note that the above tables are described in detail below.

Also, the storage unit 430 may store images of various display components and setting components, for example.

The home process unit 600 of the present embodiment includes a display control process unit 610, a process unit 620, and a storage unit 630.

The display control process unit 610 controls the display of the operation panel 205 of the operation apparatus 200 when the home application is activated. The process unit 620 sends various requests to the main apparatus 300 according to an operation accepted by the operation panel 205.

The storage unit 630 stores a magnification table 631, a display information table 632, and an application table 633. Each of the tables stored in the storage unit 630 is referenced by the display control unit 610.

Note that processes of the home process unit 600 of the present embodiment will be described in detail with respect to a third embodiment of the present invention.

Figure 9:
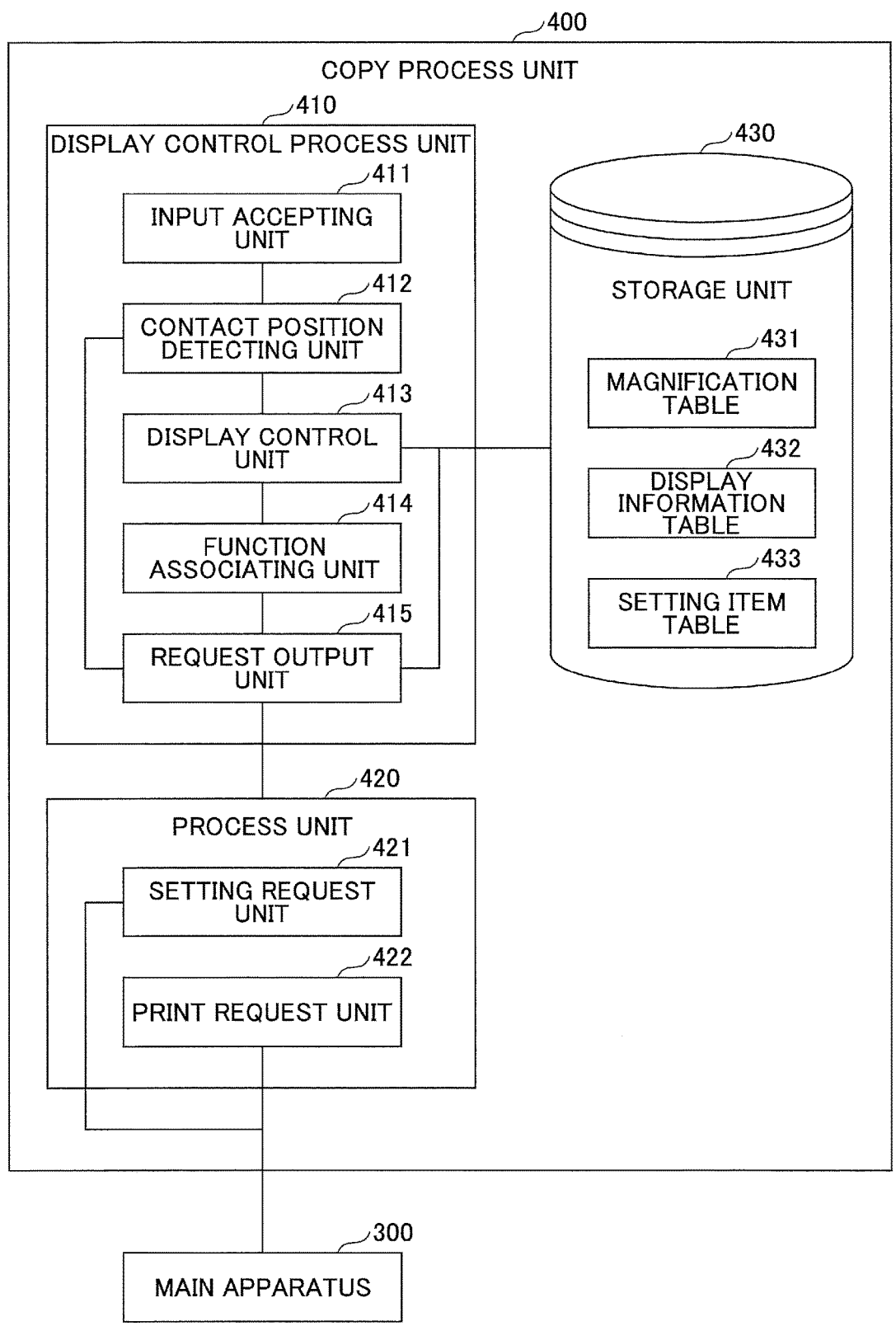
FIG. 9 is a block diagram illustrating an example functional configuration of a copy process unit according to the first embodiment.

In the following, the copy process unit 400 of the present embodiment is described. FIG. 9 is a block diagram illustrating an example functional configuration of the copy process unit 400 according to the first embodiment.

The display control process unit 410 of the copy process unit 400 according to the present embodiment includes an input accepting unit 411, a contact position detecting unit 412, a display control unit 413, a function associating unit 414, and a request output unit 415.

The input accepting unit 411 accepts an input to the operation apparatus 200. Specifically, the input accepting unit 411 may detect a contact made with respect to a top screen displayed on the operation panel 205 or a contact made with respect to an operation element of the operation apparatus 200, for example.

The contact position detecting unit 412 detects a contact position of a contact made with respect to the operation panel 205. Specifically, for example, upon accepting (detecting) a contact with respect to a top screen displayed on the operation panel 205, the contact position detecting unit 412 may detect the position of the contact with respect to the operation panel 205, i.e., the position of the contact made by the user. In the present embodiment, the display component displayed on the top screen that has been operated by the user is determined based on the contact position detected by the contact position detecting unit 412.

The display control unit 413 controls the operation panel 205 to display a top screen including display components corresponding to various setting items based the tables 431-433 stored in the storage unit 430. Note that the display control unit 413 is described in detail below.

The function associating unit 414 associates a setting component with a value setting function for setting a value for a corresponding setting item when the setting component is displayed in a display component.

The request output unit 415 outputs to the process unit 420 various requests corresponding to various operations accepted via a top screen displayed on the operation panel 205.

The process unit 420 according to the present embodiment includes a setting request unit 421 and a print request unit 422. The setting request unit 421 sends a setting request to the main apparatus 300 upon receiving a request from the request output unit 415 of the display control process unit 410 to set up a value for a setting item. The print request unit 422 sends a print request to the main apparatus 300 upon receiving a request from the request output unit 415 to execute a printing process.

The storage unit 430 according to the present embodiment includes the magnification table 431, the display information table 432, and the setting item table 433.

The magnification table 431 of the present embodiment is a table associating each display component with the magnification set up for the display component by the setting item 51 or 52. The display information table 432 is a table associating each setting item corresponding to a display component with display information to be displayed in the display component according to difference magnifications.

The setting item table 433 is a table associating each setting item with setting values that may be set up for the setting item. In the present embodiment, the display control unit 413 refers to the setting item table 433 to acquire display information to be displayed in the display components.

In the following, the tables 431-433 stored in the storage unit 430 are described in detail. FIGS. 10A-10C illustrate examples of the magnification table 431 according to the first embodiment.

The magnification table 431-1 of FIG. 10A illustrates an example case in which overall reduction setting is implemented. The magnification table 431-2 of FIG. 10B illustrates an example case in which overall enlargement setting is implemented. The magnification table 431-3 of FIG. 10C illustrates an example case in which individual setting is implemented.

Note that the magnification table 431 according to the present embodiment includes the information items "setting object" and "magnification". The value of the information item "setting object" indicates the object of the enlargement/reduction setting. The value of the information item "magnification" indicates the magnification set up for the corresponding the setting object. In the following descriptions, information including all the values of the information item "setting object" and all of the values of the information item "magnification" associated with all the values of the information item "setting object" is referred to as magnification information.

For example, in the magnification table 431-1 of FIG. 10A, the magnification for the setting object "overall" is "50%", and the magnification for each of the individual setting items including "color/black & white", "directional magnification", and "number of copies" is "100%".

Thus, according to the magnification table 431-1 of FIG. 10A, the display size of each of the display components displayed on the top screen will be reduced to a magnification of 50%.

Note that in the present embodiment, the magnification of 100% is set up as a reference (default magnification) such that when the magnification of a display component is greater than 100%, the display component is displayed as an enlarged display component, and when the magnification of a display component is less than 100%, the display component is displayed as a reduced-size display component.

Also, in the magnification table 431-2 of FIG. 10B, the magnification for the setting object "overall" is "250%", and the magnification of each of the individual setting objects including "color/black & white", "directional magnification", and "number of components" is "100%".

Thus, according to the magnification table 431-2 of FIG. 10B, each of the display components displayed on the top screen will be enlarged to a magnification of 250%.

Also, in the magnification table 431-3 of FIG. 10C, the magnification for the setting object "overall" is "100%", and the magnification for the setting object "color/black & white" is "250%".

Thus, according to the magnification table 431-3 of FIG. 10C, the overall magnification setting for the display components displayed on the top screen is set to 100%, and the display component corresponding to the setting item "color/black & white" is individually set up to be enlarged to a magnification of 250%.

In the following, the display information table 432 according to the present embodiment is described with reference to FIG. 11. FIG. 11 illustrates an example of the display information table 432 according to the first embodiment.

The display information table 432 according to the present embodiment includes the information items "setting item" and "display information" that are associated with each other. Further, the display information is associated with different magnifications.

Specifically, the display information is associated with three different magnifications, including a magnification range from 10% to 50%, a magnification range from 51% to 200%, and a magnification of 201% or higher.

For example, when the magnification for the setting item "color/black & white" is 10% to 50%, the display information to be displayed by the corresponding display component includes the "setting value", and when the magnification for the setting item "color/black & white" is 51% to 200%, the display information to be displayed includes the "setting item name" and the "setting value". Also, when the magnification for the setting item "color/black & white" is 201% or higher, the display information to be displayed includes the "setting item name", "selectable setting values", "selected setting value", and "setting components".

Thus, for example, when the magnification for the setting item "color/black & white" is 10% to 50%, only the corresponding setting value "auto color" may be displayed in the display component corresponding to the setting item "color/black & white" (see FIG. 3). When the magnification for the setting item "color/black & white" is 51% to 200%, the corresponding setting item name "color/black & white" and the corresponding setting value "auto color" may be displayed in the display component corresponding to the setting item "color/black & white" (see FIG. 2).

When the magnification for the setting item "color/black & white" is 201% or higher, the corresponding setting item name "color/black & white" and the corresponding setting value "auto color" may be displayed in the display component corresponding to the setting item "color/black & white". Further, the other selectable setting values "black & white" and "full color", and setting components 211, 212, and 213 corresponding to the above setting values may be displayed (see FIG. 4).

Also, for example, when the magnification for the setting item "directional magnification" is 10% to 50%, the display information to be displayed by the corresponding display component includes the "setting value", and when the magnification for the setting item "directional magnification" is 51% to 200%, the display information to be displayed includes the "setting item name" and the "setting value". Also, when the magnification for the setting item "directional magnification" is 201% or higher, the display information to be displayed includes the "setting item name", "setting value", and "setting components (paper size)".

Thus, when the magnification for the setting item "directional magnification" is 10% to 50%, only the corresponding setting value "100%" is displayed in the display component corresponding to the setting item "directional magnification" (see FIG. 3). When the magnification for the setting item "directional magnification" is 51% to 200%, the corresponding setting item name "directional magnification" and the corresponding setting value "100%" are displayed in the display component corresponding to the setting item "directional magnification" (see FIG. 2).

When the magnification for the setting item "directional magnification" is 201% or higher, the corresponding setting item name "directional magnification" and the corresponding setting value "100%" are displayed in the display component corresponding to the setting item "directional magnification". Further, setting components 221, 222, 223, and 224 for enabling selection of a predetermined paper size as a directional magnification (resizing) setting are displayed in the display component corresponding to the setting item "directional magnification" (see FIG. 4).

In the following, the setting item table 433 according to the present embodiment is described with reference to FIG. 12. FIG. 12 illustrates an example of the setting item table 433 according to the first embodiment.

The setting item table 433 of the present embodiment includes the information items "setting item" and "setting value" that are associated with each other. More specifically, in the setting item table 433, each setting item is associated with one or more possible setting values that can be set up for the corresponding setting item.

For example, the setting item "color/black & white" is associated with possible setting values "auto color", "black & white", and "full color".

Also, the setting item "directional magnification" is associated with possible setting values "paper size" and "ratio setting". Further, the possible setting value "paper size" is associated with selectable values "A3", "letter", "A4", and "envelope". Further, the possible setting value "ratio setting" is associated with selectable values "50%", "70%", "equal", "120%", and "150%".

In the following, display information to be displayed in the display component corresponding to the setting item "directional magnification" is described.

In the display information table 432 of FIG. 11, when the corresponding magnification for the setting item "directional magnification" is 201% or higher, the display information to be displayed includes the setting value name, the setting value, and setting components (paper size). Thus, when the magnification for the setting item "directional magnification" is set to 201% or higher, the display component corresponding to the setting item "directional magnification" displays the corresponding setting item name "directional magnification", the corresponding setting value "100%", and setting components 221, 222, 223, and 224 (see FIG. 4).

Figure 13:
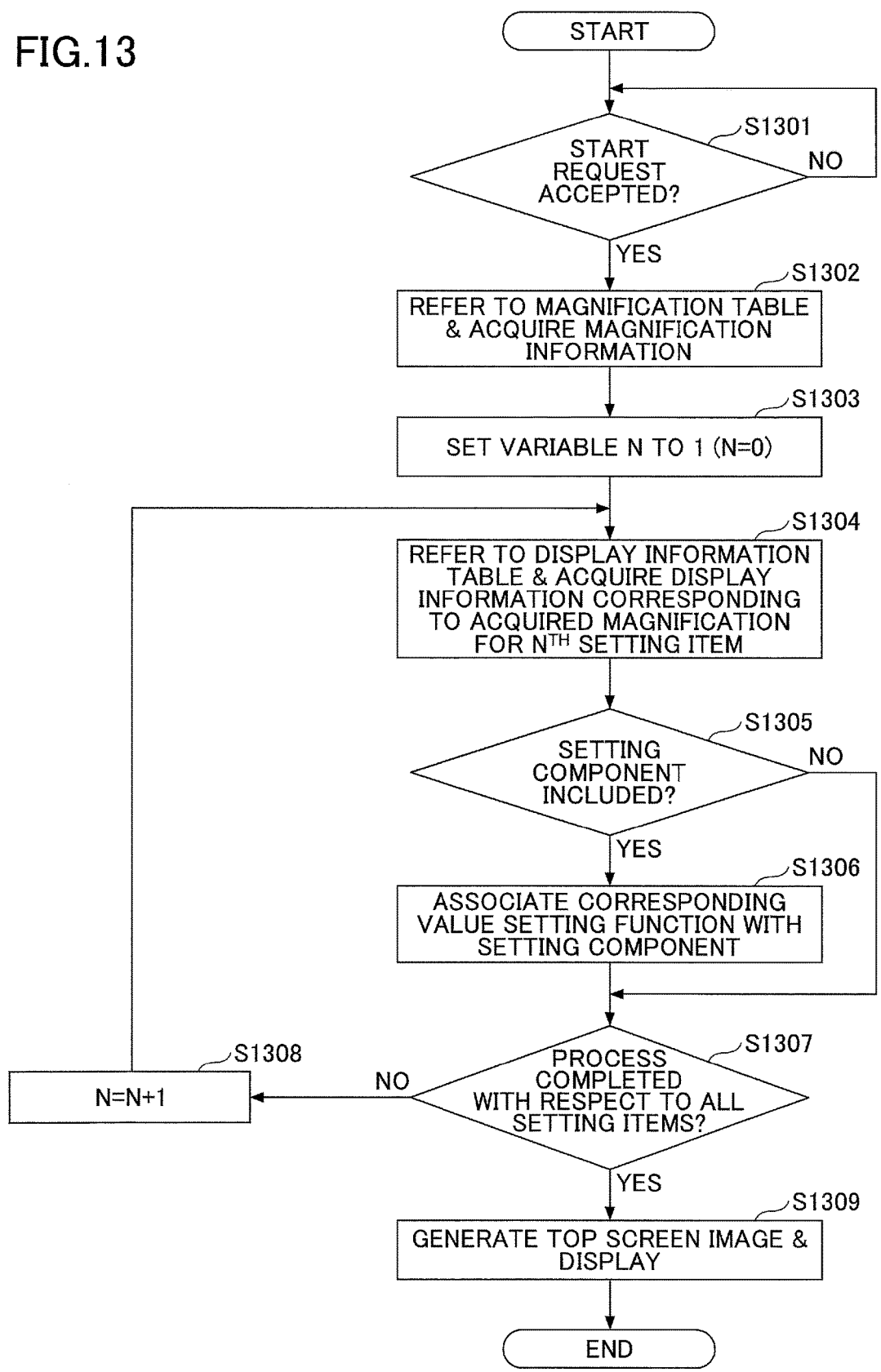
FIG. 13 is a flowchart illustrating an operation of the copy process unit according to the first embodiment.

In the following, an operation of the display control process unit 410 of the copy process unit 400 is described. FIG. 13 is a flowchart illustrating an example operation of the copy process unit 400 according to the first embodiment.

In step S1301, the copy process unit 400 of the present embodiment determines whether it has accepted a start request for starting the copy application. The start request may be issued by the home process unit 600 when the display component 11 corresponding to the copy application displayed on the home screen 1 is selected, for example.

If no start request is accepted in step S1301, the copy process unit 400 waits until it accepts a start request.

If a start request is accepted by the copy process unit 400 in step S1301, the display control process unit 410 starts a process for displaying a top screen for the copy application by executing step S1302 and subsequent process steps.

When the start request is accepted in step S1301, the operation proceeds to step S1302 in which the display control unit 413 of the display control process unit 410 refers to the magnification table 431 to acquire magnification information.

Then, in step S1303, the display control unit 413 sets a variable N to 1 (N=1). Then, in step S1304, based on the acquired magnification information and the display information table 432, the display control unit 413 acquires the magnification set up for the Nth setting item of the display information table 432 and the corresponding display information to be displayed.

In the following, the process of step S1304 is described by way of a specific example. In the example described below, it is assumed that N=3, and the magnification information of the magnification table 431-2 has been acquired by the display control unit 413.

The third setting item of the display information table 432 is the setting item "number of copies". Also, in the case where the magnification information is acquired from the magnification table 431-2, the overall magnification setting is 250%, and the magnification of the setting item "number of copies" is 100%.

Accordingly, the display control unit 413 determines that the magnification for the setting item "number of copies" is 250%, and acquires the display information for the setting item "number of copies" corresponding to the magnification of 250% (magnification of 201% or higher) from the display information table 432. Specifically, the acquired display information includes the setting item name "number of copies", the setting value "5", and setting components 231 and 232.

Note that in acquiring the setting value set up for each setting item in the image processing apparatus 100 according to the present embodiment, the display control unit 413 may send an acquisition request for acquiring the setting value to the request output unit 415, and the request output unit 415 may acquire the setting value from the main apparatus 300 via the process unit 420, for example.

Then, in step S1305, the function associating unit 414 of the display control process unit 410 determines whether the acquired display information includes display components configured to accept setting operations. That is, the function associating unit 414 determines whether the display information to be displayed includes setting components.

If it is determined in step S1305 that no setting components are included in the display information to be displayed, the display control process unit 410 proceeds to step S1307, which is described below.

If it is determined in step S1305 that setting components are included in the display information to be displayed, the function associating unit 414 of the display control process unit 410 associates each setting component with a corresponding value setting function (step S1306). Specifically, the function associating unit 414 determines the display area of the setting component within the operation panel 205, and associates an operation on the identified display area with a process for setting up a corresponding setting value for the corresponding setting item.

In the following, the process of step S1306 is described by way of a specific example. In the example described below, it is assumed that the acquired display information includes the setting item name "number of copies", the setting value "5", and the setting components 231 and 232.

In this case, the function associating unit 414 of the display control process unit 410 determines that the acquired display information includes the setting components 231 and 232. Accordingly, the function associating unit 414 determines the display areas of the setting components 231 and 232 within the operation panel 205. Then, with respect to the display area of the setting component 231, the function associating unit 414 associates one contact (touch) of the display area with a process for incrementing the number of copies to be printed by one. Also, with respect to the display area of the setting component 232, the function associating unit 414 associates one contact (touch) of the display area with a process for decrementing the number of copies to be printed by one.

According to an aspect of the present embodiment, by associating each setting component with a corresponding value setting function in the above-described manner, when a setting component of a display component is operated, a corresponding value may be set up for the setting item corresponding to the display component.

Then, in step S1307, the display control unit 413 of the display control process unit 410 determines whether the processes of step S1304 and the subsequent process steps have been executed with respect to all the setting items included in the display information table 432. If it is determined in step S1307 that the processes have not been executed with respect to all the setting items, the display control unit 413 adds 1 to the variable N (N=N+1) (step S1308), and returns to step S1304.

If it is determined in step S1307 that the processes have been completed with respect to all the setting items, the display control unit 413 generates a top screen image including the display components corresponding to the setting items, based on the magnification information and the display information corresponding to each of the setting items, and displays the generated top screen on the operation panel 205 (step S1309).

As described above, according an aspect of the present embodiment, the display size of one or more display components corresponding to setting items displayed on a top screen may be adjusted to a desired size. Further, according to an aspect of the present embodiment, the amount of information to be displayed in a display component may be changed by changing the display size of the display component.

Specifically, when the display size of a display component is reduced, only the setting value for the setting item corresponding to the display component may be displayed. In this way, the number of setting items displayed on the top screen as a list of setting items may be increased. That is, the list of setting items displayed on the top screen may be more detailed.

Also, when the display size of a display component is increased, the setting value for the setting item and the setting components for setting up (changing) the setting value for the setting item may be displayed in the display component. In this way, the top screen can be arranged to display a list of setting items as well as display information to be displayed in a detailed setting screen for each of the setting items.

As described above, according to an aspect of the present embodiment, by changing the display information that is displayed in a display component according to a change in the display size of the display component, the display area of the top screen may be efficiently used, for example.

Note that process units corresponding to other applications included in the application layer 210 of the present embodiment (e.g., scan application, fax application) may each have a display control process unit that implements processes similar to the processes implemented by the display control process unit 410 of the copy process unit 400. Accordingly, a top screen similar to the top screen 2 for the copy application may be displayed for each of the applications included in the application layer 210, and the top screen for each of the applications may similarly include features for enlarging/reducing the display size of display components and changing the display information displayed in the display components according to the display size of the display components.

Second Embodiment

In the following, a second embodiment of the present invention is described. The second embodiment differs from the above-described first embodiment in that the magnification table and the display information table is associated with each individual user. In the following description of the second embodiment, features that differ from those of the first embodiment are described. On the other hand, features of the second embodiment that are substantially the same as those of the first embodiment are given the same reference numerals and their descriptions may be omitted.

Figure 14:
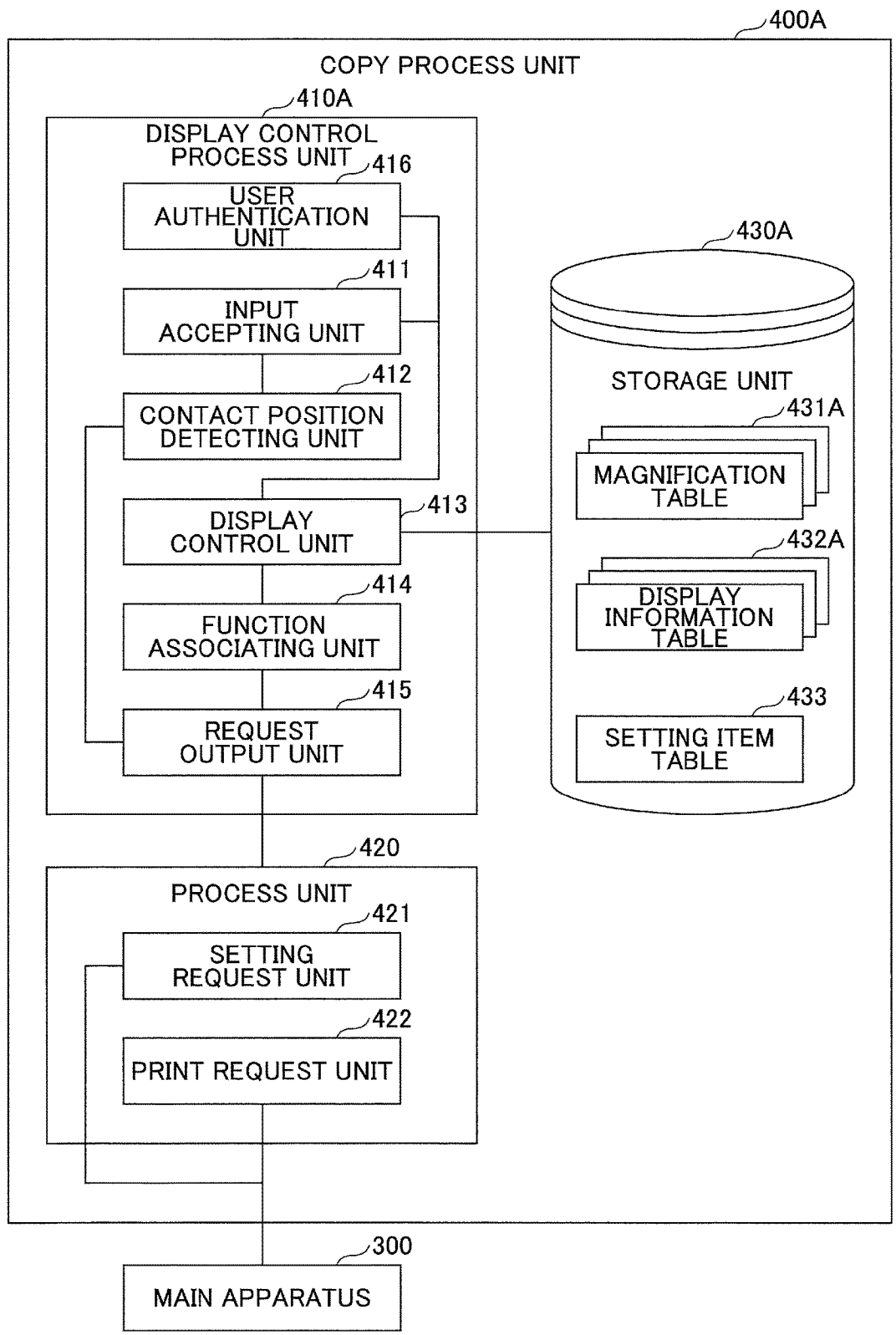
FIG. 14 is a block diagram illustrating an example functional configuration of the copy process unit according to a second embodiment of the present invention.

FIG. 14 is a block diagram illustrating an example functional configuration of a copy process unit 400A according to the second embodiment. The copy process unit 400A of the present embodiment includes a display control process unit 410A, the process unit 420, and a storage unit 430A.

The display control process unit 410A according to the second embodiment includes a user authentication unit 416 in addition to the functional units included in the display control process unit 410 according to the first embodiment.

The user authentication unit 416 performs user authentication based on user information that has been input to the operation apparatus 200. For example, before displaying the top screen 2, the operation apparatus 200 may be controlled to display a login screen, and the user authentication unit 416 may perform user authentication based on user information input to the login screen (e.g., user ID and password). The user authentication unit 416 may also perform user authentication by acquiring user information from an IC card that has been held over a scanning device that is connected to the operation apparatus 200, for example.

In the present embodiment, user authentication may be performed by comparing the input user information with user information stored in a user information database that may be managed by a storage device of the operation apparatus 200 or the main apparatus 300, for example. Also, in the present embodiment, user authentication may be performed by transmitting the input user information to an authentication server that is connected to the image forming apparatus 100 via a network, and authenticating a user if the authentication server authenticates the user information, for example.

The storage unit 430A according to the present embodiment includes a magnification table 431A and a display information table 432A. The magnification table 431A according to the present embodiment is associated with a specific user. That is, in the present embodiment, the storage unit 430A includes the magnification table 431A for each individual user.

After the user information is authenticated by the user authentication unit 416, the display control process unit 410A according to the present embodiment implements a process for displaying a top screen based on the magnification table 431A and the display information table 432A that are associated with the authenticated user information.

Figure 15:
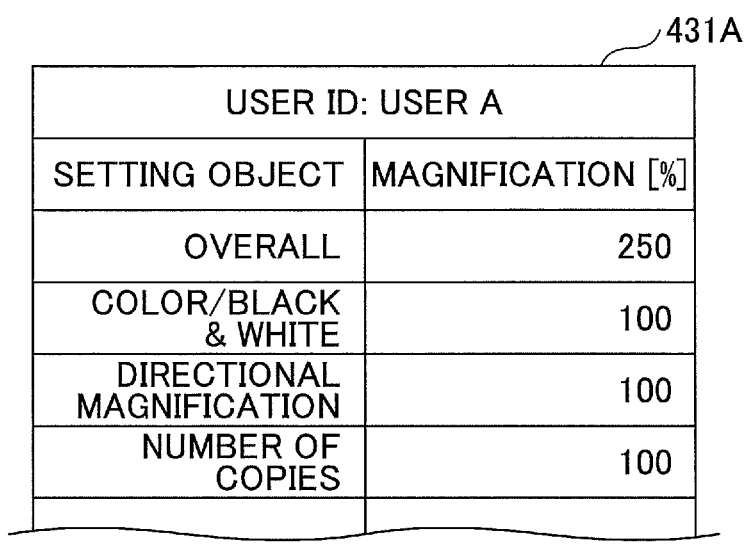
FIG. 15 illustrates an example of the magnification table according to the second embodiment.

FIG. 15 illustrates an example of the magnification table 431A according to the second embodiment. In the magnification table 431A according to the present embodiment, magnification information is associated with a user ID.

In FIG. 15, the magnification table 431A is associated with the user ID "user A". As such, the magnification table 431A of FIG. 15 may be referenced by the display control process unit 410A when the user authentication unit 416 successfully authenticates the user ID "user A".

In the magnification table 431A of FIG. 15, the magnification for the setting object "overall" is "250%", and the magnification for each of the individual setting items including "color/black & white", "directional magnification", and "number of copies" is "100%".

Thus, according to the magnification table 431A, the display components displayed on the top screen will be uniformly enlarged to a magnification of 250%.

Also, note that when a magnification setting is changed while the user with the user ID "user A" is logged in, the magnification table 431A according to the present embodiment may be updated according to the change.

FIG. 16 illustrates an example of the display information table 432A according to the second embodiment. The display information table 432A according to the present embodiment is associated with a user ID. The display information table 432A of FIG. 16, which is associated with the user ID "user A", may be referenced by the display control process unit 410A when the user authentication unit 416 successfully authenticates the user ID "user A", for example.

In the display information table 432A of FIG. 16, for example, display information corresponding to each of the different magnifications for the setting item "color/black & white" is the same as the display information for the setting item "color/black & white" indicated in the display information table 432 of FIG. 11.

Also, in the display information table 432A of FIG. 16, when the magnification for the setting item "directional magnification" is 10% to 50%, the display information to be displayed by the corresponding display component includes the "setting value", and when the magnification for the setting item "directional magnification" is 51% to 200%, the display information to be displayed includes the "setting item name" and the "setting value". When the magnification for the setting item "directional magnification" is 201% or higher, the display information to be displayed includes the "setting item name", "setting value", and "setting components (ratio setting)".

Also, when the content of the display information is changed while the user with the user ID "user A" is logged in, the display information table 432A may be updated according to the change.

In the following, an operation of the copy process unit 400A according to the second embodiment is described with reference to FIG. 17. FIG. 17 is a flowchart illustrating an example operation of the copy process unit 400A according to the second embodiment.

In step S1701, the copy process unit 400A according to the present embodiment determines whether it has accepted a start request. If no start request has been accepted in step S1701, the copy process unit 400A waits until it accepts a start request.

When the copy process unit 400A accepts a start request in step S1701, the user authentication unit 416 of the display control process unit 410A performs user authentication (step S1702). If the user is not authenticated in step S1702, the display control process unit 410A repeats the user authentication process of step S1702.

If the user is authenticated in step S1702, the display control process unit 410A proceeds to step S1703.

The processes of steps S1703 to S1710 are substantially identical to the processes of steps S1302 to S1309 of FIG. 13, and as such, descriptions thereof are omitted. Note, however, that the magnification table 431A that is referred to in step S1703 and the display information table 432A that is referred to in step S1705 are tables associated with the user information that has been authenticated in step S1703.

Note that in the example of FIG. 17, user authentication is performed after a start request for the copy application has been accepted. However, the present embodiment is not limited thereto. That is, user authentication may also be performed before accepting a start request for the copy application.

Specifically, for example, the user authentication unit 416 may be provided in the home process unit 600, and user authentication may be performed when displaying the home screen 1. That is, in the present embodiment, user authentication may be performed at any time as long as the display control process unit 410A is able to refer to the magnification table 431A and the display information table 432A that are associated with the user information used in the user authentication.

FIG. 18 is a diagram illustrating an example of a top screen 2D for the copy application according to the second embodiment. The top screen 2D of FIG. 18 is a screen displayed based on the magnification table 431A and the display information table 432A associated with the user ID "user A".

In the magnification table 431A, the magnification for the setting object "overall" is "250%", and the magnification for the individual setting items including "color/black & white", "directional magnification", and "number of copies" is "100%".

Thus, in the top screen 2D of FIG. 18, enlarged display components 21B, 22B-1, 23B, and 24B that are enlarged to a magnification of 250% are displayed.

In the following, the enlarged display component 22B-1 is described. The enlarged display component 22B-1 according to the present embodiment is displayed based on the display information corresponding to a magnification of 201% or higher for the setting item "directional magnification" included in the display information table 432A.

According to the display information table 432A of the present embodiment, the display information corresponding to a magnification of 201% or higher for the setting item "directional magnification" includes "setting name", "setting value", and "setting components (ratio setting)".

Accordingly, the display control unit 413 of the present embodiment may refer to the setting item table 433, and display the setting item name "directional magnification", the setting value "equal", and setting components 225-229 for setting up corresponding setting values for the "ratio setting" in the display component 22B-1.

Note that the setting components 225-229 respectively correspond to setting values "50%", "70%", "equal", "120%", and "150%" that may be set up as the ratio setting for the setting item "directional magnification".

As described above, in the present embodiment, by including the magnification table 431A associated with each individual user and the display information table 432A associated with each individual user, a top screen may be arranged to have display components displayed based on magnification information set up for each individual user and display information set up for each individual user. Thus, according to an aspect of the present embodiment, the manner in which display components are displayed on a top screen may be suitably adjusted according to the preferences and usage of each individual user.

Third Embodiment

In the following, a third embodiment of the present invention is described. The third embodiment differs from the above-described embodiments in that the display size and the display information of display components corresponding to the applications executed by the image processing apparatus 100 can be changed rather than the display components corresponding to setting items for an application. Note that in the following descriptions, features of the third embodiment that differ from those of the first embodiment are described. On the other hand, features of the third embodiment that are substantially identical to those of the first embodiment are given the same reference numerals and descriptions thereof may be omitted.

Figure 19:
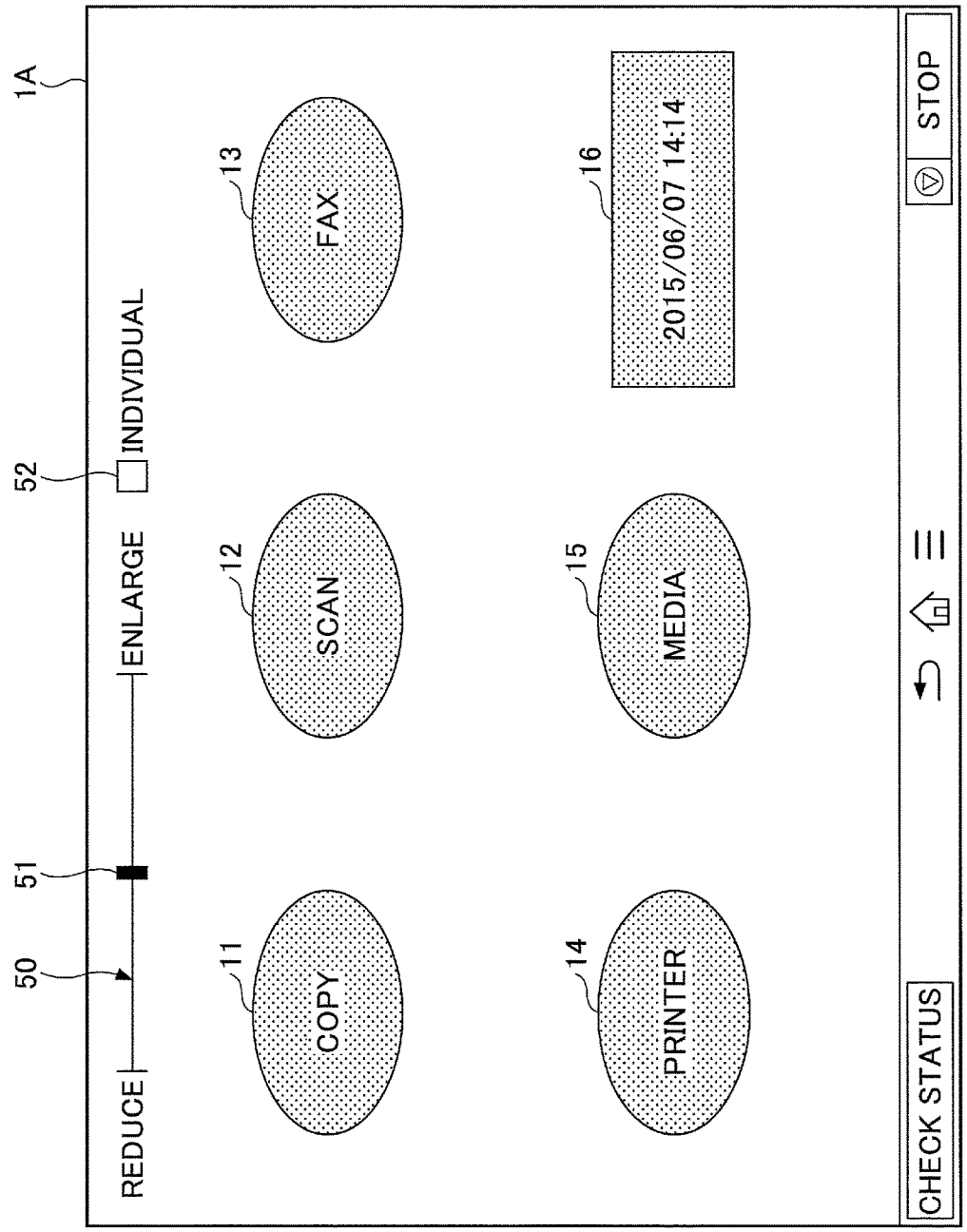
FIG. 19 is a diagram illustrating a first example of the home screen according to a third embodiment of the present invention.

FIG. 19 is a diagram illustrating a first example of a home screen 1A according to the third embodiment. The home screen 1A of the present embodiment displays the setting components 51 and 52. The setting component 51 is a display component for setting (enlarging/reducing) the display size of the display components 11-16 displayed on the home screen 1A by enlarging/reducing a display area of a home screen image corresponding to the display of the operation panel 205. The setting component 52 is a display component for individually setting (enlarging/reducing) the display size of each of the display components 11-16 displayed in the home screen 1A.

In the present embodiment, by enlarging/reducing the display size of the display components 11-16 using the setting component 51 or the setting component 52, the display size of the display components 11-6 displayed on the home screen 1A may be changed, and the amount of information displayed in the display components may be changed.

Figure 20:
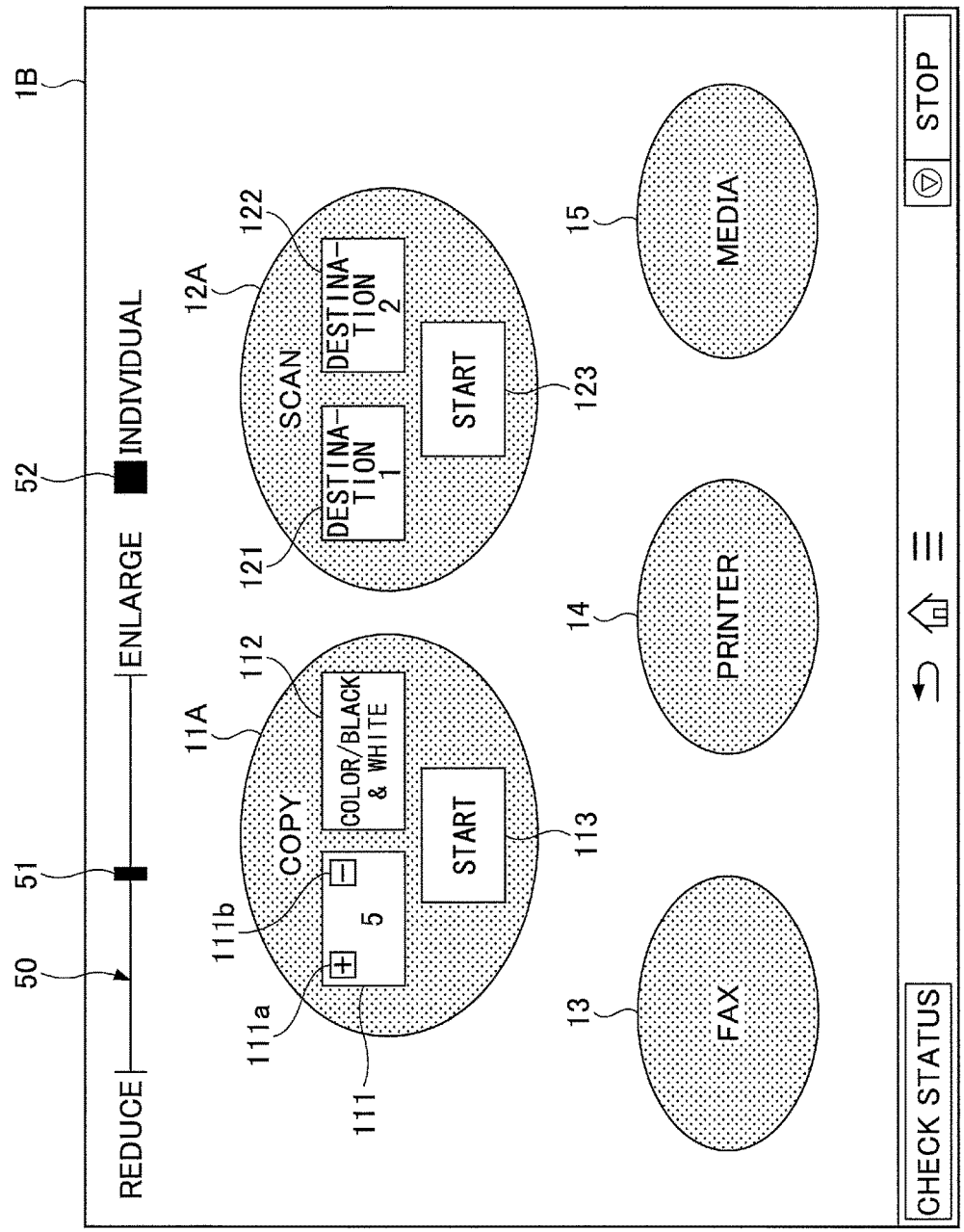
FIG. 20 is a diagram illustrating a second example of the home screen according to the third embodiment.

FIG. 20 is a diagram illustrating an example of a home screen 1B according to the third embodiment. In the home screen 1B of FIG. 20, individual setting is implemented by the setting component 52 with respect to the display component 11 to display an enlarged display component 11A, and with respect to the display component 12 to display an enlarged display component 12A.

In the enlarged display component 11A displayed on the home screen 1B, setting instruction components 111 and 112 for instructing the copy application to apply (change) a setting, and an execution instruction component 113 for instructing the copy application to execute a process. In other words, the setting instruction components 111 and 112 and the execution instruction component 113 are operation display components for performing operations with respect to the copy application. More specifically, the setting instruction components 111 and 112 are display components for instructing the copy process unit 400 to apply a setting, and the execution instruction component 113 is a display component for instructing the copy process unit 400 to execute a process.

Further, in the setting instruction component 111, setting components 111a and 111b for setting up a setting value for the setting item corresponding to the setting instruction component 111 are displayed.

In the enlarged display component 12A displayed on the home screen 1B, setting instruction components 121 and 122 for instructing the scan application to implement a setting and an execution instruction component 123 for instructing the scan application to execute a process are displayed. In other words, the setting instruction components 121 and 122 are display components for instructing the scan process unit to apply a setting, and the execution instruction component 123 is a display component for instructing the scan process unit to execute a process.

In the present embodiment, a display information table 632 is provided that associates each display component corresponding to an application included in the image forming apparatus 100 with display information to be displayed in the display component according to different magnifications.

Figure 21:
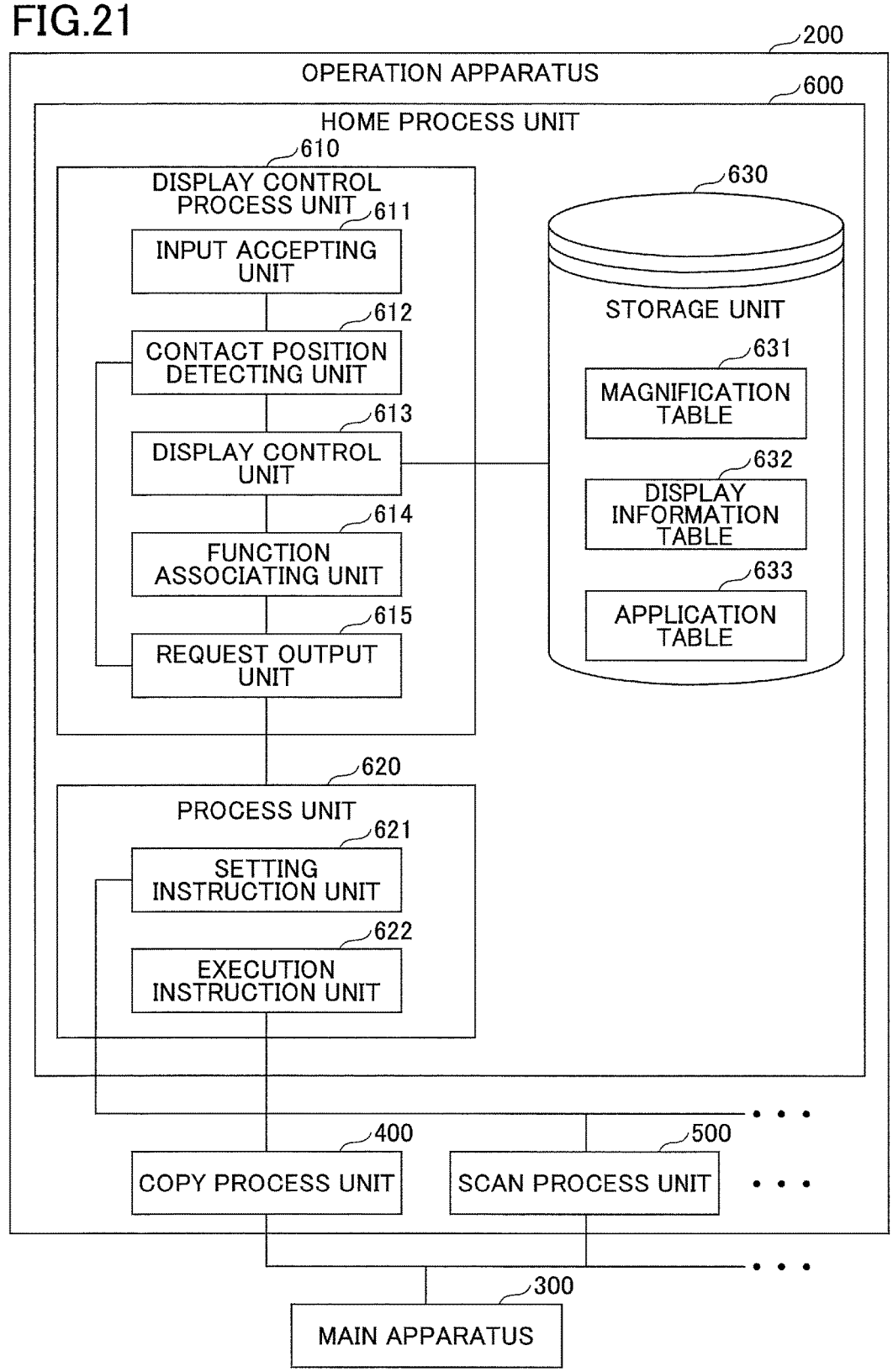
FIG. 21 is a block diagram illustrating an example functional configuration of a home process unit according to the third embodiment.

In the following, the home process unit 600 according to the present embodiment is described with reference to FIG. 21. FIG. 21 is a block diagram illustrating an example functional configuration of the home process unit 600 according to the third embodiment. The home process unit 600 included in the operation apparatus 200 according to the present embodiment includes a display control process unit 610, a process unit 620, and a storage unit 630.

The display control process unit 610 according to the present embodiment includes an input accepting unit 611, a contact position detecting unit 612, a display control unit 613, a function associating unit 614, and a request output unit 615.

The input accepting unit 611 accepts an input to the operation apparatus 200. Specifically, the input accepting unit 611 detects a contact made with respect to the home screen displayed on the operation panel or an operation on an operation element of the operation apparatus 200, for example.

The contact position detecting unit 612 accepts a contact made with respect to the operation panel 205 and detects the position of the contact. Specifically, upon accepting an operation with respect to the home screen, the contact position detecting unit 612 detects the position on the operation panel 205 that has been operated; i.e., the position touched by the user. In the present embodiment, the contact position detected by the contact position detecting unit 612 is used to determine the display component on the home screen that has been operated by the user.

The display control unit 613 controls the display of the home screen including display components corresponding to applications included in the image forming apparatus 100 based on information included in tables stored in the storage unit 630. Note that the display control unit 613 is described in detail below.

The function associating unit 614 associates a setting instruction component and an execution instruction component included in a display component corresponding to an application with corresponding functions for instructing a setting value to be set up for an application or instructing the execution of a process of the application.

The request output unit 615 outputs various requests corresponding to various operations accepted by the home screen displayed on the operation panel 205 to the process unit 620.

The process unit 620 of the present embodiment includes a setting instruction unit 621 and an execution instruction unit 622. The setting instruction unit 621 instructs an application (process unit) to set up a setting value for a setting item when it receives a setting instruction request from the request output unit 615. The execution instruction unit 622 instructs an application (process unit) to execute a process when it receives an execution instruction request from the request output unit 615.

That is, in the present embodiment, the process unit 620 outputs setting instructions for setting up a setting value for a setting item and execution instructions for executing a process to various process units (e.g., copy process unit 400, scan process unit 500) corresponding to the applications included in the image processing apparatus 100.

The storage unit 630 according to the present embodiment stores a magnification table 631, the display information table 632, and an application table 633.

The magnification table 631 is a table associating each display component with the magnification set up for the display component by the setting component 51 or 52. The display information table 632 associates each application corresponding to a display component with display information to be displayed in the display component according to different magnifications.

The application table 633 associates each application with the types of operations that can be performed with respect to the application. In the present embodiment, display information to be displayed in a display component included in the home screen is acquired from the display information table 632 based on the application table 633.

Figure 22:
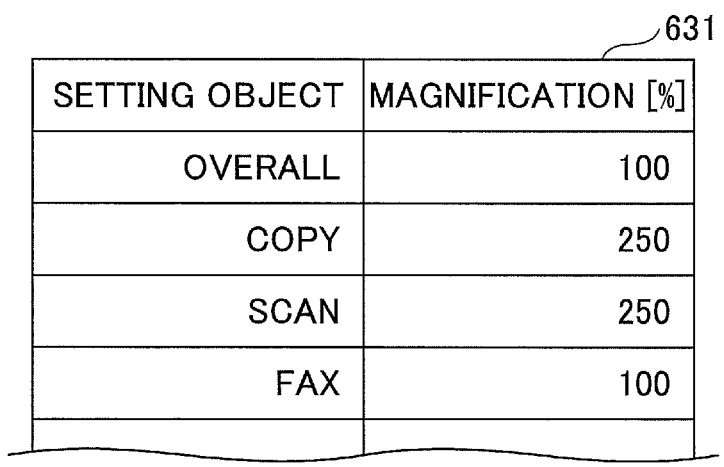
FIG. 22 illustrates an example of the magnification table according to the third embodiment.

In the following, the tables stored in the storage unit 630 are described with reference to FIGS. 22-25. FIG. 22 illustrates an example of the magnification table 631 according to the third embodiment.

The magnification table 631 according to the present embodiment includes application names as values for the information item "setting object".

In the magnification table 631 of FIG. 22, the overall enlargement/reduction setting is not implemented, and the display component corresponding to the setting object "copy" and the display component corresponding to the setting object "scan" are individually set up to a magnification of 250% (to be displayed as enlarged display components). Note that the display component corresponding to the setting object "copy" in FIG. 22 refers to the display component 11 corresponding to the copy application in the home screen, and the display component corresponding to the setting object "scan" in FIG. 22 refers to the display component 12 corresponding to the scan application in the home screen.

FIG. 23 illustrates an example of the display information table 632 according to the third embodiment. The display information table 632 includes the information items "application name" and "display information" that are associated with each other. The display information is associated with different magnifications.

More specifically, the display information is associated with three different magnifications, including a magnification range of 10% to 50%, a magnification range of 51% to 200%, and a magnification of 201% or higher.

For example, with respect to the application name "copy", when the magnification is 10% to 50%, the display information to be displayed includes the "application name", and when the magnification is 51% to 200%, the display information to be displayed includes the "application name" and the "execution instruction component (start)". Further, when the magnification is 201% or higher, the display information to be displayed includes the "application name", and the "execution instruction component (start)", and the "setting instruction components (number of copies, color)".

Thus, according to the display information table 632 of FIG. 23, when the magnification is 10% to 50%, only the application name "copy" will be displayed in the display component corresponding to the application name "copy" (see FIG. 19).

When the magnification is 201% or higher, the application name "copy", the execution instruction component 113, and the setting instruction components 111 and 112 will be displayed in the display component corresponding to the application name "copy" (see FIG. 20). The execution instruction component 113 is for instructing the execution (start) of a copy process. The setting instruction component 111 is for instructing the setting of a setting value for the setting item "number of copies" for a copy process. The setting instruction component 112 is for instructing the setting of a setting value for the setting item "color/black & white" for the copy process.

Also, with respect to the application name "scan", when the magnification is 10% to 50%, the display information to be displayed includes the "application name", and when the magnification is 51% to 200%, the display information to be displayed includes the "application name", the "setting instruction component (destination 1)", and the "execution instruction component (start)". When the magnification is 201% or higher, the display information to be displayed includes the "application name", the "setting instruction components (destination 1, destination 2)", and the "execution instruction component (start)".

Thus, when the magnification is 201% or higher, the application name "scan", the execution instruction component 123, and the setting instruction components 121 and 122 will be displayed in the display component corresponding to the application name "scan" (see FIG. 20). The execution instruction component 123 is for instructing the execution (start) of a scan process. The setting instruction component 121 is for instructing the setting of a setting value for a setting item "destination 1" for a scan process. The setting instruction component 122 is for instructing the setting of a setting value for the setting item "destination 2" for the scan process.

FIG. 24 illustrates an example of the application table 633 according to the third embodiment. The application table 633 includes the information items "application" and "operation type" that are associated with each other. More specifically, in the application table 633, each application name is associated with the types of operations that can be performed with respect to the corresponding application (via a display component corresponding to the application).

For example, the application name "copy" is associated with the operation types "start", "stop", "color setting", "directional magnification setting", "number of copies setting", "density setting", and "paper feed tray setting."

Thus, according to the application table 633, the types of operations that can be performed with respect to the copy application via the display component 11 include instructing the copy application to "start" or "stop" a copy process, and instructing the copy application to set up setting values for setting items, such as "color/black & white" and "directional magnification", for example.

Also, the application name "scan" is associated with the operation types "start", "stop", and "destination registration setting".

Thus, according to the application table 633, the types of operations that can be performed with respect to the scan application via the display component 12 includes instructing the scan application to "start" or "stop" a scan process, and instructing the scan application to set up a setting value for the setting item "destination".

Figure 25:
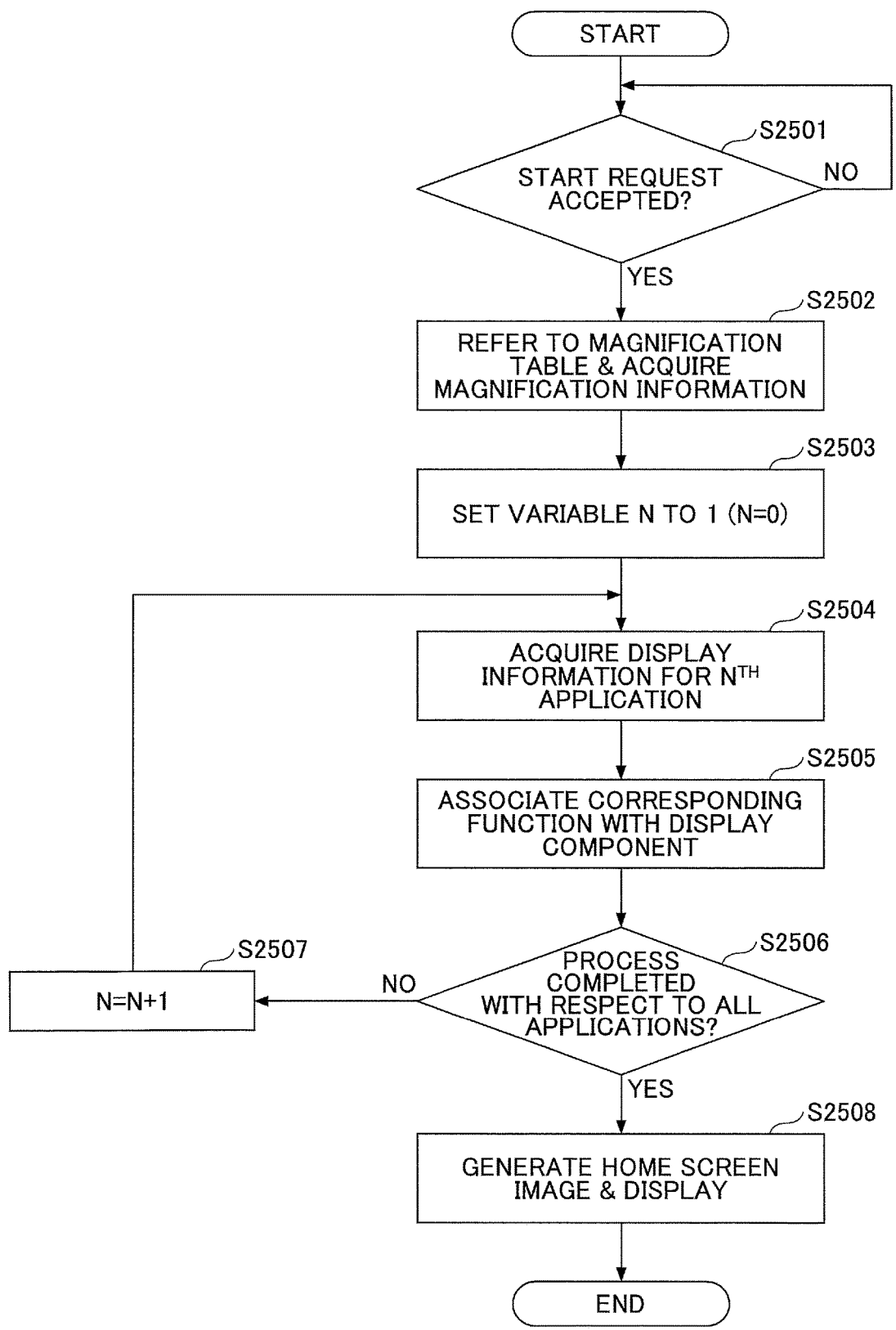
FIG. 25 is a flowchart illustrating an operation of the home process unit according to the third embodiment.

In the following, an example operation of the home process unit 600 according to the present embodiment is described with reference to FIG. 25. FIG. 25 is a flowchart illustrating an operation of the home process unit according to the third embodiment.

In step S2501, the home process unit 600 determines whether it has accepted a start request. Note that the start request may be sent to the home process unit 600 when power is supplied to the operation apparatus 200 or when the operation apparatus 200 is switched from sleep mode to operation mode, for example.

If no start request is accepted in step S2501, the home process unit 600 waits until it accepts a start request.

If the home process unit 600 accepts a start request in step S2501, the display control process unit 610 of the home process unit 600 starts a process for displaying a home screen by executing step S2502 and subsequent process steps.

Upon accepting a start request in step S2501, the display control unit 613 of the display control process unit 610 refers to the magnification table 631 and acquires the magnification information (step S2502).

Then, in step S2503, the display control unit 613 sets the variable N to 1 (N=1). Then, in step S2504, based on the acquired magnification information and the display information table 632, the display control unit 613 acquires the display information for the Nth application name at the corresponding magnification.

In the following, the process of step S2504 is described by way of a specific example. In the example described below, it is assumed that N=1, and the display control unit 613 has acquired the magnification information from the magnification table 631 of FIG. 22.

As can be appreciated, the first application name listed in the display information table 632 is "copy". Also, according to the magnification information of the magnification table 631, the overall magnification setting is 100%, and the magnification setting for the application name "copy" is 250%.

Thus, the display control unit 613 may determine that the magnification setting for the application name "copy" is 250%, identify the display information for the application name "copy" at the magnification of 250% in the display information table 632, and acquire the display information including the application name "copy", the execution instruction component 113, and the setting instruction components 111 and 112.

Then, in step S2505, the function associating unit 614 of the display control process unit 610 associates the setting instruction components and the execution instruction components included in the acquired display information with corresponding functions for instructing setting operations and process execution operations. Specifically, the function associating unit 614 identifies a display area in which the execution instruction component is to be displayed within the operation panel 205, and associates an operation on the identified display area with a process execution instruction for the application. Also, the function associating unit 614, identifies a display area in which the setting instruction component is to be displayed within the operation panel 205, and associates an operation on the identified display area with a corresponding setting instruction for the application.

According to an aspect of the present embodiment, by associating the execution instruction component and the setting instruction component with corresponding functions in the above-described manner, when an execution instruction component or a setting instruction component that is displayed in a display component is operated, a corresponding execution instruction or setting instruction may be issued with respect to the application corresponding to the display component.

Then, in step S2506, the display control unit 613 of the display control process unit 610 determines whether the processes of step S2504 and subsequent process steps have been executed with respect to all the applications corresponding to all the display components displayed on the home screen. If it is determined in step S2506 that the processes have not been executed with respect to all the applications, the display control unit 613 sets the variable N to N=N+1 (step S2507), and returns to step S2504.

If it is determined in step S2506 that the processes have been completed with respect to all the application, the display control unit 613 generates a hone screen image including the display components corresponding to the applications based on the magnification information and the display information corresponding to each application, and controls the operation panel 205 to display the generated home screen image (step S2508).

Figure 26:
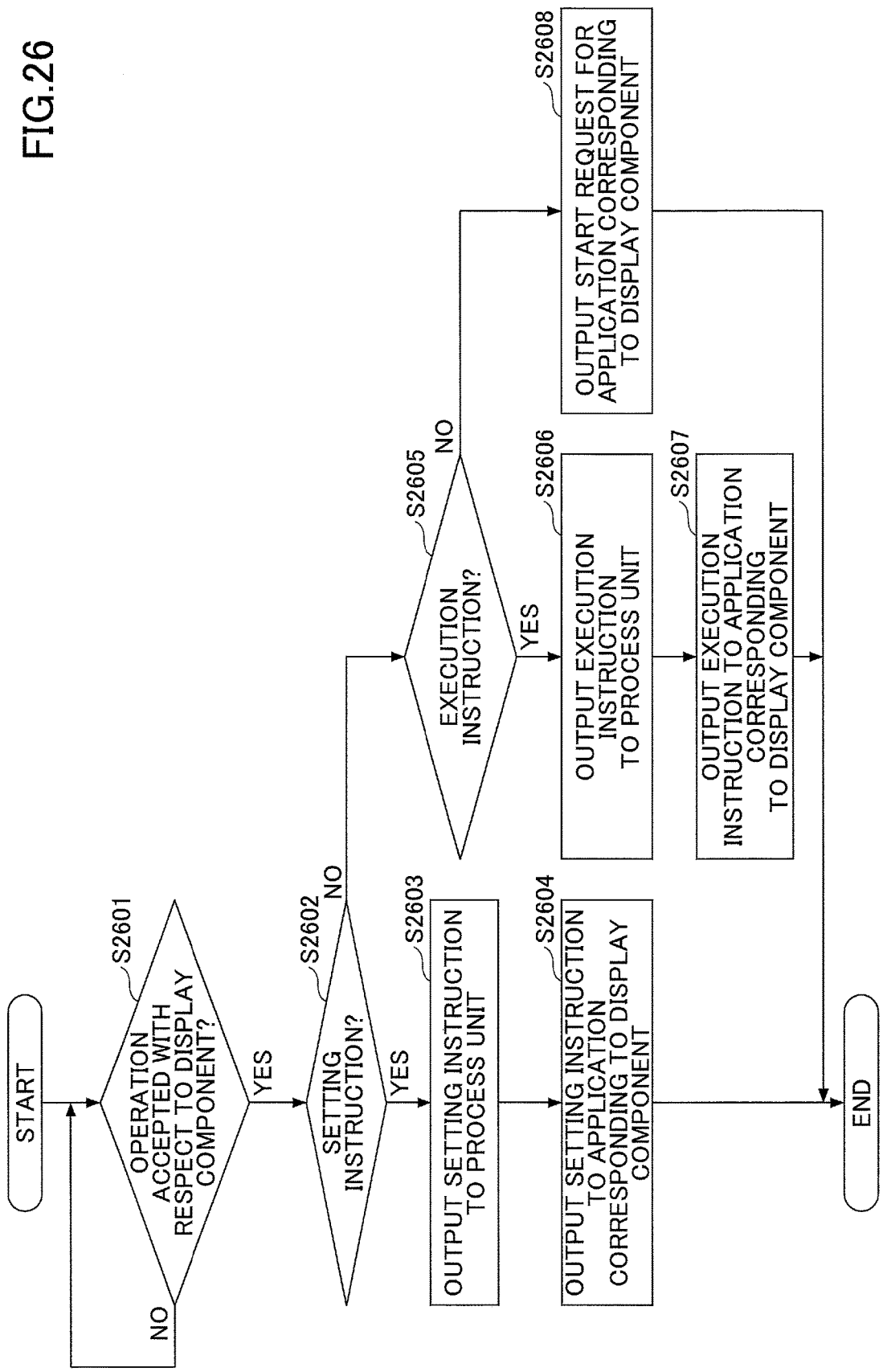
FIG. 26 is a flowchart illustrating another operation of the home process unit according to the third embodiment.

In the following, another example operation of the home process unit 600 according to the present embodiment is described with reference to FIG. 26. FIG. 26 is a flowchart illustrating an operation implemented by the home process unit 600 according to the third embodiment in a case where an operation is accepted by the home screen 1B.

In step S2601, the input accepting unit 611 of the home process unit 600 according to the present embodiment determines whether it has accepted an operation with respect to one of the display components displayed on the home screen. If no operation is accepted in step S2601, the input accepting unit 611 waits until it accepts an operation on a display component.

If an operation on a display component is accepted in step S2601, the contact position detecting unit 612 of the display control unit 610 determines whether the position at which the operation has been made corresponds to the display area of a setting instruction component (step S2602). That is, in step S2602, the display control process unit 610 determines whether a setting instruction has been issued.

If it is determined in step S2602 that a setting instruction has not been issued, the display control unit 610 proceeds to step S2605, which is described below.

If it is determined in step S2602 that a setting instruction has been issued, the request output unit 615 outputs a setting instruction request corresponding to the setting instruction component that has been operated to the setting instruction unit 621 of the processing unit 620 (step S2603). The setting instruction unit 621 receives the setting instruction request and outputs a corresponding setting instruction to the application corresponding to the display component that has been operated (step S2604).

If no setting instruction is issued in step S2602, the contact position detecting unit 612 of the display control process unit 610 determines whether the position at which the operation has been made corresponds to a display area of an execution instruction component (step S2605). That is, in step S2605, the display control process unit 610 determines whether an execution instruction has been issued.

If it is determined in step S2605 that an execution instruction has not been issued, the process proceeds to step S2608, which is described below.

If it is determined in step S2605 that an execution instruction has been issued, the request output unit 615 outputs an execution instruction request corresponding to the execution instruction component that has been operated to the execution instruction unit 622 of the process unit 620 (step S2606). The execution instruction unit 622 receives the execution instruction request, and outputs a corresponding execution instruction to the application corresponding to the display component that had been operated (step S2607).

If it is determined in step S2605 that no execution instruction has been issued, the display control unit 610 outputs a start request for starting the application corresponding to the display component that has been operated via the process unit 620 (step S2608).

In the following, an operation implemented by the home process unit 600 according to the present embodiment in a case where the enlarged display component 11A of the home screen 1B is operated is described with reference to FIG. 20.

An example case is described below where the setting component 111*a* of the setting instruction component 111 displayed in the home screen 1B has been operated. In this case, the operation may be detected as an operation made with respect to the setting component 111*a* of the setting instruction component 111 based on the contact position detected by the contact position detecting unit 612 of the home process unit 600.

The setting component 111*a* is associated with the function of incrementing the number of copies by one for the setting item "number of copies". Thus, the request output unit 615 sends a setting instruction request to the process unit 620 for incrementing the number of copies by one.

The process unit 620 receives the setting instruction request, and the setting instruction unit 621 sends an instruction to increment the setting value of the number of copies by one to the copy process unit 400.

Also, when the execution instruction component 113 displayed in the enlarged display component 11A is operated, the home process unit 600 detects that the execution instruction component 113 has been operated. The execution instruction component 113 is associated with the function of instructing the coy process unit 400 to execute a copy process.

Thus, the request output unit 615 outputs an execution instruction request to the process unit 620 to instruct the execution (start) of a copy process. The process unit 620 receives the request, and the execution instruction unit 622 instructs the copy process unit 400 to execute the copy process.

Similarly, in a case where the setting instruction component 121 displayed in the enlarged display component 12A of the home screen 1B has been operated, the home process unit 600 detects that the setting instruction component 121 has been operated. The setting instruction component 121 is associated with the function of instructing that the destination registered as "destination 1" be set up as the destination of scanned image data.

Thus, the request output unit 615 outputs a setting instruction request to the process unit 620 to have the destination registered as "destination 1" set up as the destination of the image data.

The process unit 620 receives the setting instruction request, and the setting instruction unit 621 instructs the scan process unit 500 to set up the destination registered as "destination 1" as the destination of the image data.

Further, in a case where the execution instruction component 123 displayed in the enlarged display component 12A is operated, the home process unit 600 detects that the execution instruction component 123 has been operated. The execution instruction component 113 is associated with the function of instructing the scan process unit 500 to execute a scan process.

Thus, the request output unit 615 outputs an execution instruction request to the process unit 620 to instruct the execution (start) of a scan process. The process unit 620 receives the request, and the execution instruction unit 622 instructs the scan process unit 500 to start the scan process.

As described above, according to an aspect of the present embodiment, a setting instruction and/or a process execution instruction with respect to an application may be input via the home screen. In this way, an operation may be performed with respect to an application without switching the display of the operation panel 205 from the home screen to a top screen for the corresponding application.

Note that although a home screen displayed on the operation unit 200 is described above as an example home screen, embodiments of the present invention are not limited thereto.

Also, embodiments of the present invention may be applied to a smartphone, a portable terminal, or any other type of information processing apparatus that includes an operation panel, such as a touch panel, that is capable of displaying a list of display components corresponding to applications.

For example, a display component corresponding to an application for implementing a music playback function may be displayed on a portable terminal, and when the display component is enlarged, an execution instruction component for instructing playback of music and setting instruction components for instructing the setting of the volume may be displayed in the enlarged display component. Also, setting components for setting the volume may be displayed within the setting instruction component for instructing the setting of the volume, for example.

Further, a display component corresponding to an application for implementing an email transmission/reception function may be displayed on a portable terminal, and when the display component is enlarged, an execution instruction component for instructing the execution of email transmission/reception and an execution instruction for instructing the execution of a process for displaying a portion of a received email in a predetermined area of the home screen may be displayed in the enlarged display component, for example.

As described above, according to an aspect of the present embodiment, when performing setting instruction operations and process execution instruction operations with respect to an application, the display of the operation panel does not have to be changed from a home screen to a top screen for the corresponding application. Thus, in the present embodiment, operations with respect to an application may be simplified to thereby improve operability.

Although the present invention has been described above with reference to certain illustrative embodiments, the present invention is not limited to these embodiments, and numerous variations and modifications may be made without departing from the scope of the present invention.

What is claimed is:

1. A multifunctional peripheral (MFP) comprising:
a memory storing a program; and
a processor configured to execute the program to implement processes of
displaying a setting screen for a copy application of the MFP on a display device of the MFP, the setting screen including a plurality of display components corresponding to a plurality of setting items of the copy application, each display component of the plurality of display components relating to an individual setting item;
displaying a first setting display component for setting up an enlargement or a reduction setting of a display size for the plurality of display components;
displaying a second setting display component for setting up the enlargement or the reduction setting of the display size for an individual display component from among the plurality of display components;
accepting an operation with respect to one or more display components from among the plurality of display components displayed on the setting screen;
accepting a setting operation of the first setting display component to enlarge or reduce the display size of the plurality of display components, and accepting a setting operation of the second setting display component to enlarge or reduce the display size the individual display component; and
changing display information that is displayed in a display area of the individual display component or the plurality of display components based on changes in the display size caused by the respective setting operation of the first setting display component or the second setting display component by increasing or decreasing a number of setting components that relate to the individual setting item corresponding to the individual display component or to each of the plurality of display components, wherein
when the display size of the at least one display component is enlarged, the processor further implements processes of
displaying a third setting display component for setting up a setting value for the setting item corresponding to the at least one display component in the display area of the at least one display component that has been enlarged,
accepting an operation with respect to a display area of the third setting display component, and
issuing a setting request for setting up the setting value for the setting item corresponding to the at least one display component based on the accepted operation;
at least one of the first setting display component and the second setting display component sets up a magnification for the individual display component in response to an operation with respect to the first setting display component or the second setting display component; and
the processor refers to a magnification table that associates the individual display component with the magnification set up for the individual display component and a display information table that associates the setting item corresponding to the individual display component with display information to be displayed in the individual display component according to each of a plurality of magnifications, and controls the display information corresponding to the magnification set up for the individual display component to be displayed in the display area of the individual display component.

2. The MFP according to claim 1, wherein
when the display information corresponding to the magnification set up for the individual display component includes a third setting display component for setting up a setting value for the setting item corresponding to the individual display component, the processor further implements a process of associating an operation with respect to a display area of the third setting display component with a process for setting up the setting value for the setting item corresponding to the display component.

3. The MFP according to claim 1, wherein the processor further implements processes of
authenticating a user based on user information that has been input; and
when the user information is authenticated, referring to the magnification table that is associated with the authenticated user information and the display information table that is associated with the authenticated user information, and controlling the display information corresponding to the magnification set up for the individual component to be displayed in the display area of the individual display component.

4. The MFP according to claim 1, wherein the processor further implements processes of:
displaying the first setting display component and the second setting component on a home screen that is displayed on the display device of the MFP, the home screen including one or more application display components corresponding to one or more applications, other than the copy application, provided at the MFP, wherein
the setting operation of the first setting display component sets up the enlargement or the reduction setting of the display size for all of the application display components, and
the setting operation of the second setting display component sets up the enlargement or the reduction setting of the display size for an individual application display component from among the one or more application display components; and
accepting the setting operation of the first setting display component to enlarge or reduce the display size of all the application display components, and accepting the setting operation of the second setting display component to enlarge or reduce the display size of the individual application display component.

5. The MFP according to claim 1, wherein the plurality of display components corresponding to the plurality of setting items of the copy application includes
a density display component for setting a density, wherein, upon enlarging a display size of the density display component, a slider for setting the density is displayed within the density display component.

6. The MFP according to claim 1, further comprising:
an operation apparatus that includes a first processor, and provides a user interface that is operated by the user to implement an image processing function of the copy application, wherein the first processor executes the program for controlling the enlargement or the reduction setting of the display size of the display components; and a main apparatus that includes a second processor, and includes an image forming unit, wherein the second processor controls the image forming unit to execute processes for implementing the image processing function of the copy application in response to user operations performed at the operation apparatus.

7. The MFP according to claim 1, wherein at least one of the first setting display component or the second setting display component sets up magnifications at least in ranges of 10% to 50%, 51% to 200%, and 201% or higher for the individual display component in response to an operation with respect to the at least one of the first setting display component and the second setting display component.

8. A non-transitory computer-readable medium storing a program that when executed causes a multifunctional peripheral (MFP) to perform an information processing method comprising:

displaying a setting screen for a copy application of the MFP on a display device of the MFP, the setting screen including a plurality of display components corresponding to a plurality of setting items of the copy application, each display component of the plurality of display components relating to an individual setting item;

displaying a first setting display component for setting up an enlargement or a reduction setting of a display size for the plurality of display components;

displaying a second setting display component for setting up the enlargement or the reduction setting of the display size for an individual display component from among the plurality of display components;

accepting an operation with respect to one or more display components from among the plurality of display components displayed on the setting screen;

accepting a setting operation of the first setting display component to enlarge or reduce the display size of the plurality of display components, and accepting a setting operation of the second setting display component to enlarge or reduce the display size the individual display component; and changing display information that is displayed in a display area of the individual display component or the plurality of display components based on changes in the display size caused by the respective setting operation of the first setting display component or the second setting display component by increasing or decreasing a number of setting components that relate to the individual setting item corresponding to the individual display component or to each of the plurality of display components, wherein, when the display size of the individual display component is enlarged a third setting display component for setting up a setting value for the setting item corresponding to the individual display component is displayed in the display area of the individual display component that has been enlarged, an operation with respect to a display area of the third setting display component is accepted, and a setting request for setting up the setting value for the setting item corresponding to the at least one display component is issued based on the accepted operation;

at least one of the first setting display component and the second setting display component sets up a magnification for the individual display component in response to an operation with respect to the first setting display component or the second setting display component; and the processor refers to a magnification table that associates the individual display component with the magnification set up for the individual display component and a display information table that associates the setting item corresponding to the individual display component with display information to be displayed in the individual display component according to each of a plurality of magnifications, and controls the display information corresponding to the magnification set up for the individual display component to be displayed in the display area of the individual display component.

9. An information processing method comprising steps of:

displaying a setting screen for a copy application of a multifunctional peripheral (MFP) on a display device of the MFP, the setting screen including a plurality of display components corresponding to a plurality of setting items of the copy application, each display component of the plurality of display components relating to an individual setting item;

displaying a first setting display component for setting up an enlargement or a reduction setting of a display size for the plurality of display components;

displaying a second setting display component for setting up the enlargement or the reduction setting of the display size for an individual display component from among the plurality of display components;

accepting an operation with respect to one or more display components from among the plurality of display components displayed on the setting screen;

accepting a setting operation of the first setting display component to enlarge or reduce the display size of the plurality of display components, and accepting a setting operation of the second setting display component to enlarge or reduce the display size the individual display component; and changing display information that is displayed in a display area of the individual display component or the plurality of display components based on changes in the display size caused by the respective setting operation of the first setting display component or the second setting display component by increasing or decreasing a number of setting components that relate to the individual setting item corresponding to the individual display component or to each of the plurality of display components, wherein when the display size of the individual display component is enlarged a third setting display component for setting up a setting value for the setting item corresponding to the individual display component is displayed in the display area of the individual display component that has been enlarged, an operation with respect to a display area of the third setting display component is accepted, and a setting request for setting up the setting value for the setting item corresponding to the at least one display component is issued based on the accepted operation;

at least one of the first setting display component and the second setting display component sets up a magnification for the individual display component in response to an operation with respect to the first setting display component or the second setting display component; and the processor refers to a magnification table that associates the individual display component with the magnification set up for the individual display component and a display information table that associates the setting item corresponding to the individual display component with display information to be displayed in the individual display component according to each of a plurality of magnifications, and controls the display information corresponding to the magnification set up for the individual display component to be displayed in the display area of the individual display component.

* * * * *